US009139219B2

(12) United States Patent
Moriyama et al.

(10) Patent No.: US 9,139,219 B2
(45) Date of Patent: Sep. 22, 2015

(54) ENERGY ABSORBING MEMBER AND IMPACT ABSORBING STEERING APPARATUS

(75) Inventors: Seiichi Moriyama, Gunma (JP); Hiroshi Shibazaki, Gunma (JP); Kenji Fujikawa, Gunma (JP); Masajirou Watanabe, Gunma (JP); Toru Takahashi, Gunma (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/110,847

(22) PCT Filed: Aug. 8, 2012

(86) PCT No.: PCT/JP2012/070217
§ 371 (c)(1),
(2), (4) Date: Dec. 11, 2013

(87) PCT Pub. No.: WO2013/022029
PCT Pub. Date: Feb. 14, 2013

(65) Prior Publication Data
US 2014/0083236 A1   Mar. 27, 2014

(30) Foreign Application Priority Data

Aug. 9, 2011 (JP) ................................ 2011-174186
Jan. 6, 2012 (JP) ................................ 2012-001083

(51) Int. Cl.
*B62D 1/11* (2006.01)
*B62D 1/19* (2006.01)

(52) U.S. Cl.
CPC ..................................... *B62D 1/195* (2013.01)

(58) Field of Classification Search
CPC .......... B62D 1/192; B62D 1/195; F16F 7/123

USPC ............................ 280/777; 188/371; 74/492
See application file for complete search history.

(56) References Cited

U.S. PATENT DOCUMENTS 4,838,576 A * 6/1989 Hamasaki et al. ............. 280/777
4,901,592 A * 2/1990 Ito et al. .......................... 74/492
(Continued)

FOREIGN PATENT DOCUMENTS

JP         9-272448 A    10/1997
JP       2001-114113 A    4/2001
(Continued)

OTHER PUBLICATIONS

International Search Report and Written Opinion dated Nov. 13, 2012 from the corresponding PCT/JP2012/070217.

*Primary Examiner* — Paul N Dickson
*Assistant Examiner* — Robert A Coker
(74) *Attorney, Agent, or Firm* — Katten Muchin Rosenman LLP

(57) ABSTRACT

Construction is achieved that more completely protects the driver of a vehicle during a secondary collision by gradually increasing the impact load that is absorbed by an energy absorbing member 22b the more the steering wheel displaces in the forward direction. The energy absorbing member 22b comprises a base section 27a that is provided in the center section, and a pair of impact absorbing sections 28b that extend in the forward direction from both ends of the base section 27a and have U-shaped bent back curved sections 29b in the middle section. Of these impact absorbing sections 28b, at least the portions that are nearer the tip end side than the bent back curved sections 29b are pressed so that the height of the energy absorbing member 22b with respect to a stroking section 32 gradually increases going in a direction from the bent back curved sections 29b toward the tip end side of the energy absorbing sections 28b.

17 Claims, 27 Drawing Sheets

(56) References Cited

U.S. PATENT DOCUMENTS

| | | | |
|---|---|---|---|
| 5,375,881 A * | 12/1994 | Lewis | 280/777 |
| 5,517,877 A * | 5/1996 | Hancock | 74/492 |
| 5,788,278 A * | 8/1998 | Thomas et al. | 280/777 |
| 5,961,146 A * | 10/1999 | Matsumoto et al. | 280/777 |
| 6,170,873 B1 * | 1/2001 | Jurik et al. | 280/777 |
| 6,224,104 B1 * | 5/2001 | Hibino | 280/777 |
| 6,264,240 B1 * | 7/2001 | Hancock | 280/777 |
| 6,814,373 B2 * | 11/2004 | Munro et al. | 280/777 |
| 6,840,128 B1 | 1/2005 | Shioya et al. | |
| 7,188,867 B2 * | 3/2007 | Gatti et al. | 280/777 |
| 7,325,834 B2 * | 2/2008 | Manwaring et al. | 280/777 |
| 7,914,044 B2 * | 3/2011 | Park | 280/777 |
| 2006/0049621 A1 * | 3/2006 | Lee | 280/777 |
| 2009/0218801 A1 * | 9/2009 | Park | 280/777 |

FOREIGN PATENT DOCUMENTS

| | | |
|---|---|---|
| JP | 3409572 B2 | 3/2003 |
| JP | 2007-223486 A | 9/2007 |
| JP | 2007-302012 A | 11/2007 |
| JP | 2008-230266 A | 10/2008 |
| JP | 2010-13010 A | 1/2010 |
| JP | 2011-131682 A | 7/2011 |
| JP | 2011-148354 A | 8/2011 |
| WO | 0115958 A1 | 3/2001 |

* cited by examiner

ENERGY ABSORBING MEMBER AND IMPACT ABSORBING STEERING APPARATUS

TECHNICAL FIELD

The present invention relates to an impact absorbing steering apparatus that eases impact that is applied to the body of a driver during a secondary collision when the body of a driver collides with the steering wheel in a collision accident, and to an energy absorbing member that is assembled in this impact absorbing steering apparatus and forms part of an impact absorbing function by plastically deforming while absorbing impact.

BACKGROUND ART

FIG. 19 illustrates an example of conventional construction of a steering apparatus of an automobile. The steering apparatus is constructed such that the rotation of the steering wheel 1 is transmitted to the input shaft 3 of a steering gear unit 2, and as the input shaft 3 rotates, the rotation pushes or pulls a pair of right and left tie rods 4, which applies a steering angle to the front wheels. The steering wheel 1 is supported by and fastened to the rear end section of a steering shaft 5, and the steering shaft 5, being inserted in the axial direction through a cylindrical shaped steering column 6, is supported by the steering column 6 so as to rotate freely. Moreover, the front end section of the steering shaft 5 is connected to the rear end section of an intermediate shaft 8 by way of a universal joint 7, and the front end section of the intermediate shaft 8 is connected to the input shaft 3 by way of a different universal joint 9. In the example in the figure, a tilt mechanism for adjusting the up-down position of the steering wheel 1, a telescopic mechanism for adjusting the forward-backward position, and an electric power-steering apparatus that uses an electric motor 10 as an auxiliary power source that makes it possible to reduce the force required for operating the steering wheel 1 are assembled.

There is a need for construction in a steering apparatus for an automobile that makes it possible to protect the driver during a collision accident. For example, the intermediate shaft 8 is constructed so as to be able to transmit torque, as well as to be able to contract over the entire length due to an impact load; and during a primary collision in a collision accident in which the automobile collides with another automobile, contraction of the intermediate shaft 8 prevents the steering wheel 1 from displacing toward the rear and being pushed up toward the body of the driver regardless of whether the steering gear unit 2 displaces toward the rear. Moreover, during a collision accident, after the primary collision, a secondary collision occurs in which the body of the driver collides with the steering wheel 1. In order to ease the impact that is applied to the body of the driver during this secondary collision, the steering column 6 is supported by the vehicle so as to be able to break away when a large force is applied in the forward direction.

FIG. 20 to FIG. 24 illustrate a first example of conventional construction of an impact absorbing steering apparatus as disclosed in JP 2011-148354 (A) that comprises this kind of impact absorbing mechanism. In this construction, a column-side bracket 11 that supports the middle section of the steering column 6 is supported by a vehicle-side bracket 15 that is fastened to the vehicle by way of a pair of right and left locking capsules 20 and bolts 21 (see FIG. 19) so as to be able to break away when a large force is applied in the forward direction. Moreover, as the secondary collision advances, in order to absorb the impact energy that is applied to the steering column 6 from the body of the driver as the steering column 6 displaces in the forward direction, a pair of right and left energy absorbing members 22 are provided between a portion that displaces in the forward direction together with the steering column 6 and a portion that is supported by the vehicle or by the vehicle-side bracket 15 that does not displace in the forward direction.

The column-side bracket 11 is obtained by bending a metal plate such as steel plate, and has a pair of right and left support plate sections 13 that are provided in the up-down direction, and a pair of right and left installation plate sections 14 that are provided so as to protrude in the left-right direction of the steering column 6 from the top end sections of these support plate sections 13. The installation plate sections 14 can also be constructed from a single plate. Moreover, part of the edges on the bottom ends of the support plate sections 13 are connected by a connecting section such that the column-side bracket 11 is a single body. Of these installation plate sections 14, locking notches 23 are provided in positions on both the right and left sides of the steering column 6, and are open on the rear end edges of the installation plate sections 14. These locking notches 23 have a trapezoidal shape such that the width dimension becomes smaller going toward the front (back side). There are also locking capsules 20 that are assembled inside these locking notches 23. The locking capsules 20 are obtained by injection molding of synthetic resin, or by die casting of a light alloy, and have locking grooves 24 on the right and left side surfaces of each. The space between the bottom surfaces of a pair of locking grooves 24 that are formed in these side surfaces becomes more narrow going toward the front to correspond with the width of the locking notches 23.

This kind of locking capsule 20 is supported by the installation plate section 14 by engaging the locking grooves 24 with the portions on both sides of the locking notch 23 in part of the installation plate section 14. Moreover, with the small through holes 25 that are formed in the portions on both sides of the locking notch 23 in part of the installation plate section 14 aligned with the small through holes 26 that are formed in the locking capsule 20, locking pins (not illustrated in the figure) that are made of synthetic resin or light alloy are located so as to span between these small through holes 25, 26. With these locking pins, the locking capsule 20 is supported by the installation plate section 14 so as to break away toward the rear only when a large impact load is applied. There are locking capsules having different numbers of through holes 25, 26 and locations where they are formed. Moreover, instead of small through holes 25 in the installation plate section 14 side, it is also possible to provide small notches that open to the locking notch 23.

The locking capsule 20 is supported by and fasted to the vehicle-side bracket by the bolt 21 that is inserted from the bottom through the through hole 43 provided in the center section of the locking capsule 20. Therefore, a screw hole is directly formed in the vehicle-side bracket 15 for screwing the bolt 21 into, or a nut is fastened to the top surface of the vehicle-side bracket 15. The locking capsule 20 and installation plate section 14 are connected with somewhat large strength and rigidity by the engagement between the portions on both sides of the locking notch 23 and the locking grooves 24, and locking pins that span between the small through holes 25, 26. Therefore, normally, the column-side bracket 11 is firmly supported by the vehicle.

On the other hand, an energy absorbing members 22 are provided between the locking capsules 20 that are supported by the vehicle-side bracket 15 and the column-side bracket 11 that displaces in the forward direction together with the steering column 6. An energy absorbing member 22 is obtained by bending a wire material that can plastically deform such as mild steel or stainless steel. More specifically, with the center section as a straight base section 27, both end sections of this base section 27 are bent at right angles toward the front to form a pair of impact absorbing sections 28. By bending back the middle sections of these impact absorbing sections 28 downward and toward rear in a U shape, bent back curved sections 29 are formed. The base section 27 of each of the energy absorbing members 22 locks into a support groove 30 that is provided in the top surface of the rear section of the locking capsule 20, and the inner circumferential edges of the bent back curved sections 29 engage with the edge on the front end of the installation plate section 14.

In the case illustrated in the figure, in order to simplify the work of assembling the locking capsules 20 in the vehicle-side bracket 15, a hanger bracket 31 is mounted on the locking capsule 20 so as to cover the top and bottom surfaces and part of the rear end surface of the locking capsule 20. So as to provide the hanger bracket 31, the base section 27 of the energy absorbing member 22 is locked in the support groove 30 of the locking capsule 20. When this hanger bracket 31 is not provided, it is possible to omit the support groove 30 and to lock the base section 27 to the side surface on the rear side of the locking capsule 20. The construction of a hanger bracket 31 is disclosed in JP 2011-148354 (A), JP 2010-13010 (A) and JP 2011-131682 (A), and it is not related to the scope of this invention, so a detailed explanation thereof is omitted.

When an automobile, in which this kind of impact absorbing steering apparatus is installed, is involved in a collision accident, first, the front section of the vehicles is smashed in by the primary collision, and the steering column 6 is pushed toward the rear, in this state, the engagement between the locking capsule 20 and the locking notch 23 is maintained, and displacement of the steering column 6 toward the rear is prevented. However, during a secondary collision, when a strong force is applied in the forward direction to the steering column 6 from the steering wheel 1, the locking pins that span between the through holes 25, 26 shear off, and with the locking capsules 20 remaining in that position, the installation plate sections 14 displace toward the front, which allows the steering wheel 1 to displace in the forward direction.

When the installation plate sections 14 displace in the forward direction due to a secondary collision, the bent back curved sections 29 of the energy absorbing members 22 move toward the tip end sections of the impact absorbing sections 28 while being stroked by the edges on the front ends of the installation plate sections 14, and allows the support bracket 11, which includes the installation plate sections 14 to displace in the forward direction. When this happens, the impact energy that is applied to the support bracket 11 during a secondary collision is absorbed by the plastic deformation of the impact absorbing sections 28, which eases the impact that is applied to the body of the driver. In order to effectively perform this kind of energy absorption, stroking sections 32, the front surfaces thereof being convex curved surfaces (stroking surfaces), are formed in the portions that face the inner circumferential edges of the bent back curved sections 29 on the front end edges of each of the installation plate sections 14. Moreover, a pair of small through holes (not illustrated in the figure) are formed in part of the downward hanging plate sections 33 that are bent downward from the tip end edges of the stroking sections 32, and the portions of the impact absorbing sections 28 that are nearer the tip ends than the bent back curved sections 29 are inserted though these small through holes. With this kind of construction, the tip end sides of the impact absorbing sections 28 is prevented from displacing downward during a secondary collision, which keeps the bent back curved sections 29 from opening up, and thus it is possible for the bent back curved sections 29 to move toward the tip ends of the impact absorbing sections 28 while being stroked.

FIG. 25 to FIG. 28 illustrate a second example of conventional construction of an impact absorbing steering apparatus as disclosed in JP 3,409,572 (B2). In this second example of conventional construction, there is neither a tilt mechanism nor a telescopic mechanism, and a rear-side support bracket 35, which is one of the front/rear column-side brackets composed of a single plate obtained by bending a steel plate having sufficient rigidity is fastened to the middle section of the steering column 6a by welding. Installation plate sections 14a that are provided on the right and left, and a front-side downward hanging plate section 36 that is bent downward from the front end edge of the stroking sections 32a that are provided on the front end edges of the installation plate sections 14a, and a rear-side downward hanging plate section 37 that is bent downward from the center section on the rear end edges of the installation plate sections 14a is formed on the rear-side support bracket 35. A circular hole 38 is formed on the bottom side of the center section of the front-side downward hanging plate section 36, and a semicircular notch 39 is formed on the bottom edge of the rear-side downward hanging plate section 37. The curvature of the circular hole 38 and the notch 39 nearly coincide with the curvature of the outer circumferential surface of the steering column 6a. The rear-side support bracket 35 is fastened to the outer circumferential surface of the middle section of the steering column 6a, with the steering column 6a inserted through the circular hole 38 and the outer circumferential surface of the steering column 6a abutted on the notch 39, by welding the inner circumferential edges of the circular hole 38 and notch 39 to the outer circumferential surface of the steering column 6a.

In this second example of conventional construction as well, locking notches 23 that are open on the rear end edge side of the installation plate section 14a are formed in each of the installation plate sections 14a, and locking capsules 20a are supported on the inside of each of the locking notches 23. With locking pins (not illustrated in the figure) spanning between small notches (not illustrated in the figure) that are provided in the perimeter edges of the locking notches 23 and that are open to the locking notches 23, and small through holes 26 that are formed in the locking capsules 20a, the locking capsules 20a are supported by and fastened to the vehicle-side bracket 15 that is fastened to the vehicle by bolts 21 or studs that are inserted through the through holes 43 that are formed in the center sections of the locking capsules 20a. With this kind of construction, as in the first example of conventional construction, the rear-side support bracket 35 that supports the middle section of the steering column 6a is supported by the vehicle-side bracket 15, which is fastened to the vehicle, by way of the locking pins, the pair of right and left locking capsules 20a and bolts 21 so as to be able to break away when a large force is applied in the forward direction.

In this second example of conventional construction as well, energy absorbing members 22a are provided between the locking capsules 20a that are supported by the vehicle-side bracket 15 and the rear-side support bracket 35 that displace in the forward direction together with the steering column 6a. The energy absorbing members 22a are obtained by bending metal wire that can plastically deform, with each energy absorbing member 22a comprising a base section 27a that is formed in the center section of the metal wire, a pair of impact absorbing sections 28a that are formed by bending both end sections of the base section 27a at right angles toward the front, and bent back curved sections 29a that are formed in the middle sections of these impact absorbing sections 28a bending back these middle section downward and toward the rear into U shapes. In this second example of conventional construction, instead of providing a hanger bracket, the base end sections 27a of the pair of energy absorbing members 22a are locked on the side surface of the rear side of the pair of right and left locking capsules 20a, and the inner edge of the bent back curved sections 29a engage with the front end edges of the installation plate sections 14a. Moreover, of the impact absorbing sections 28a, by bending the connecting sections between the base sections 27a and the bent back curved sections 29a directions toward each other, the distance between the bent back curved sections 29a and between the sides of the impact absorbing sections 28a that are further toward the tip end side than the bent back curved sections 29a is reduced, and when the base sections 27a are locked to the locking capsules 20a, the work of attaching the rear-side support bracket 35 to the support plate 15 can be easily performed so that these engaged members do not accidentally separate.

In this second example of conventional construction, a space 41 having a dimension "t" is set between the bent back curved section 29a of the energy absorbing members 22a and the convex curved surface of the stroking section 32a (see FIG. 25). Therefore, during a secondary collision, the installation plate sections 14a is displaced forward by a dimension "t", after which, the energy absorbing members 22a absorb the impact load of a secondary collision by allowing the bent back curved sections 29a to move toward the tip end sections of the impact absorbing sections 28a while being stroked by the stroking sections 32a. The other construction and functions of this second example of conventional construction are the same as in the first example of conventional construction.

In the impact absorbing steering apparatus of both the first and second examples of conventional construction, there is room for improvement from the aspect of more completely protecting the driver during a secondary collision. In other words, in the case of the first example of conventional construction, the inner circumferential edge sections of the pair of bent back curved sections 29 of each of energy absorbing members 22 come in contact with the stroking sections 32 with nearly the same positional relationship. On the other hand, in the case of the second example of conventional construction, the inner edge sections of the pair of bent back curved sections 29a of each of energy absorbing members 22a face the respective stroking sections 32a through spaces 41 having the same distance and the same positional relationship. In this way, in the case of the impact absorbing steering apparatuses of the first and second examples of conventional construction, all of the four bent back curved sections 29, 29a start to be stroked at the same time. However, in order to completely protect the driver, preferably, immediately after the secondary collision begins, the load required for causing the steering wheel 1 (see FIG. 19) to displace in the forward direction is kept low, and this load increases as the secondary collision advances. In other words, preferably, the amount of the impact load that is absorbed by the energy absorbing members 22, 22a is initially small at the beginning of displacement, and gradually increases.

JP 2007-223486 (A) discloses construction in which in an energy absorbing member that is obtained by bending wire that is plastically deformable, the positions in the forward-backward direction of the pair of bent back curved sections are different, and the load required for causing the steering wheel to displace in the forward direction immediately after a secondary collision begins is reduced. However, this energy absorbing member has an increased width dimension, so in addition to special construction for causing the bent back curved section to plastically deform during a secondary collision, the size of the energy absorbing member is increased in order to maintain the total amount of impact energy that can be absorbed, and thus the manufacturing cost increases, so is not practical construction.

Moreover, in order to change the characteristics of the energy absorbing members for absorbing the impact load, a structure where a through hole is provided in the metal plate is disclosed in JP 2001-114113 (A), and a structure where the metal wire is heat-treated or treated with high-frequency hardening or a structure where the cross-sectional area of the metal wire is varied is disclosed in JP 2008-230266 (A) and JP2007-302012 (A). However, in the case of the invention disclosed in JP 2001-114113 (A), a metal plate is used so the cost increases when compared with the case of using a metal wire. Moreover, in the case of the invention disclosed in JP 2008-230266 (A) and JP 2007-302012 (A), setting the heat treatment conditions or hardening conditions is difficult, so the cost increases, which alone makes it difficult to obtain stable performance. Furthermore, in the case of construction of simply changing the cross-sectional area, the cost of the wire increases.

RELATED LITERATURE

Patent Literature

[Patent Literature 1] JP 2011-148354 (A)
[Patent Literature 2] JP 2010-013010 (A)
[Patent Literature 3] JP 2011-131682 (A)
[Patent Literature 4] JP 3,409,572 (B2)
[Patent Literature 5] JP 2007-223486 (A)
[Patent Literature 6] JP 2001-114113 (A)
[Patent Literature 7] JP 2008-230266 (A)
[Patent Literature 8] JP 2007-302012 (A)

SUMMARY OF THE INVENTION

Problem to be Solved by the Invention

In consideration of the problems described above, the object of the present invention is to provide construction in which in order to more completely protect the driver, it is possible to gradually increase the impact load that is absorbed by the energy absorbing members the more the steering wheel displaces in the forward direction, and furthermore, to achieve low-cost construction that is further capable of stably reducing the impact that is applied to the body of the driver at the instant that a secondary collision occurs, while at the same time maintaining the total amount of energy that can be absorbed.

Means for Solving the Problems

The energy absorbing member of the present invention is made using a metal material that is plastically deformable and comprises: a base section that is supported by one of portions that are supported by either of a steering column or a vehicle; and an impact absorbing section that continues from the base section and extends in one direction in the forward-backward direction, and having a bent back curved section in the middle section that is bent in a U shape, with the tip end facing the other direction in the forward-backward direction; wherein when the steering column displaces in the forward direction due to an impact load that is applied during a secondary collision, the energy absorbing member absorbs the impact load by allowing the bent back curved section to move toward the tip end side while a stroking section, which is provided on the other of the portions that are supported by either the steering column or vehicle, strokes the bent back curved section.

When the base section of the energy absorbing member is supported by the portion that is supported by the vehicle, the impact absorbing section extends from the base section in the forward direction, and then by way of the bent back curved section, the tip end faces toward the rear. On the other hand, when the base section of the energy absorbing member is supported by the portion that is supported by the steering column, the impact absorbing section extends from the base section toward the rear, and then by way of the bent back curved sections, the tip end faces toward the front.

Particularly, the energy absorbing member of a first aspect of the present invention is such that the cross-sectional area of the impact absorbing section is the same along the entire length, and the section modulus with respect to an axis in the width direction of a stroking surface of the stroking section gradually increases going toward the tip end side in at least a portion thereof nearer the tip end side than the bent back curved section.

Causing the section modulus of the energy absorbing member to change in this way, can be achieved, for example, by making the height of the energy absorbing section with respect to the stroking surface of the stroking section gradually increase going toward the tip end side in at least the portion nearer the tip end side than the bent back curved section.

Preferably, the energy absorbing member is formed by bending a wire material, and the base section is provided in the center section of the wire material, and extends in the width direction. Moreover, a pair of right and left impact absorbing sections is provided as the impact absorbing section so as to continue and extend from both ends of the base section. The tip ends of the impact absorbing sections are free ends, and in at least the portion of each of the impact absorbing sections nearer the tip end side than the bent back curved section, the height with respect to the stroking surface of the stroking section gradually increases going toward the tip end side. Changing the height of the energy absorbing member can be achieved by pressing the portion where the height is to be changed before bending the wire material.

In this case, the cross-sectional shape of the wire material is a circular shape or a rectangular shape.

On the other hand, the energy absorbing member of a second aspect of the present invention has a pair of right and left impact absorbing sections which are constructed with: a first impact absorbing section that has a first bent back curved section; and a second impact absorbing section that has a second bent back curved section that is separated from the base section more than the first bent back curved section. It is possible to combine and apply the first and second aspects of the present invention.

The energy absorbing member of the present invention is applied to an impact absorbing steering apparatus, that has: a steering column; a column-side bracket that corresponds to the portion that is supported by the steering column, and supports the middle section of this steering column; a vehicle-side bracket that corresponds to the portion that is supported by the vehicle, and is fastened to the vehicle; and a locking member that corresponds to the portion supported by the vehicle, and together with being fastened to the vehicle-side bracket, locks the column-side bracket so that when an impact load is applied in the forward direction to the steering column, the steering column and the column-side bracket are able to break away in the forward direction.

In other words, the impact absorbing steering apparatus of the present invention is such that the energy absorbing member according to the first aspect or the second aspect of the present invention is provided between the steering column or column-side bracket and the vehicle-side bracket or the locking member.

Particularly, the present invention is preferably applied to an impact absorbing steering apparatus wherein the column-side bracket has a pair of installation plate sections that are provided so as to project on the right and left sides of the steering column; and each installation plate section comprises a locking notch that is open on the edge of the rear end, and a convex curved surface that constitutes the stroking section; each of the locking members is composed of a locking capsule that comprises: locking grooves that are provided on the right and left side surfaces thereof and that engage with portions on both sides of the locking notch in part of the installation plate section, and a through hole that is provided in the portion between the locking grooves; the column-side bracket is supported by and fastened to the vehicle side bracket by the locking members locking with the installation plate sections by the locking grooves of the locking members engaging with portions on both sides of the locking notches in part of the installation plate sections.

In this case, preferably, the base sections of the energy absorbing members are locked to the rear section of the locking capsules so as to be prevented from displacing in the forward direction, and the inner edges of the bent back curved sections of the impact absorbing sections face the convex curved surface.

In construction in which a pair of installation plate sections, a pair of locking members and a pair of energy absorbing members are provided on both the right and left of the steering column in this way, particularly when an energy absorbing member of the second aspect is applied as at least one of the energy absorbing members, preferably, a locking section is provided in a portion of the top surface of the installation plate section that is adjacent to the second impact absorbing section in order to prevent the energy absorbing member from rotating due to an impact load that is applied to the first bent back curved section after the first bent back curved section has begun to be stroked by the convex curved surface due to a secondary collision.

In this case, the energy absorbing members are provided between the pair of installation plate sections and the locking capsules that are locked to the installation plate sections, and the first impact absorbing sections of these energy absorbing members are located on the center sides in the width direction of the column-side bracket of the installation plate sections, and the second impact absorbing sections of these energy absorbing members are located on both end sides in the width direction of the column-side bracket of the installation plate sections, and the locking sections are formed by bending upward part of both end section in the width direction of the column-side bracket of the installation plate sections.

More specifically, the locking sections can be bent up pieces that are formed by bending upward the portions between a pair of gaps that are formed being separated in the forward-backward direction in both end sections in the width direction of the column-side bracket of the installation plate sections.

Effect of the Invention

With the energy absorbing members of the present invention and the impact absorbing steering apparatus of the present invention to which the energy absorbing members are applied, it is possible to more completely protect the driver against a impact load due to a secondary collision when compared with the conventional construction. In other words, in the first aspect of the present invention, the section modulus with respect to an axis in the width direction of a stroking surface of a stroking section that strokes the energy absorbing members while keeping the cross-sectional area of the energy absorbing member the same along the entire length gradually increases going in a direction toward the tip end side in at least the portions nearer the tip end side than the bent back curved sections. Therefore, at the instant that a secondary collision occurs, the impact load that the energy absorbing members absorb is small, and it is possible to keep the impact that is applied to the body of the driver at that instant small. On the other hand, as the secondary collision advances, it is possible to gradually increase the impact load that is absorbed by the energy absorbing members, and thus in a limited stroke, it is possible to absorb a large impact load.

Moreover, with the second aspect of the present invention, it is further possible to stably reduce the impact that is applied to the body of the driver at the instant that a secondary collision occurs, while maintaining the total amount of impact energy that can be absorbed. In other words, as the installation plate sections of the support bracket displaces in the forward direction together with the steering wheel and steering column during a secondary collision, first one of the impact absorbing sections of each pair of right and left energy absorbing members begins to plastically deform. The bent back curved sections that are provided in the middle sections of the one impact absorbing sections is stroked by the stroking section, and begins to move toward the tip end side. At this instant, the bent back curved sections that are provided in the middle sections of the other impact absorbing sections are separated from the stroking section, so at the instant that the secondary collision occurs, it is possible to reduce the impact load that is absorbed by the energy absorbing members, and at that instant lessen the impact that is applied to the body of the driver. As the secondary collision advances, the bent back curved sections of the other impact absorbing sections also come in contact with the stroking sections, and begin to plastically deform. As a result, as in the first aspect, it is possible to maintain the amount of impact load on the steering wheel that is absorbed during a secondary collision without excessively increasing the stroke through which the steering wheel displaces in the forward direction.

MODES FOR CARRYING OUT THE INVENTION

First Example

Figure 19:
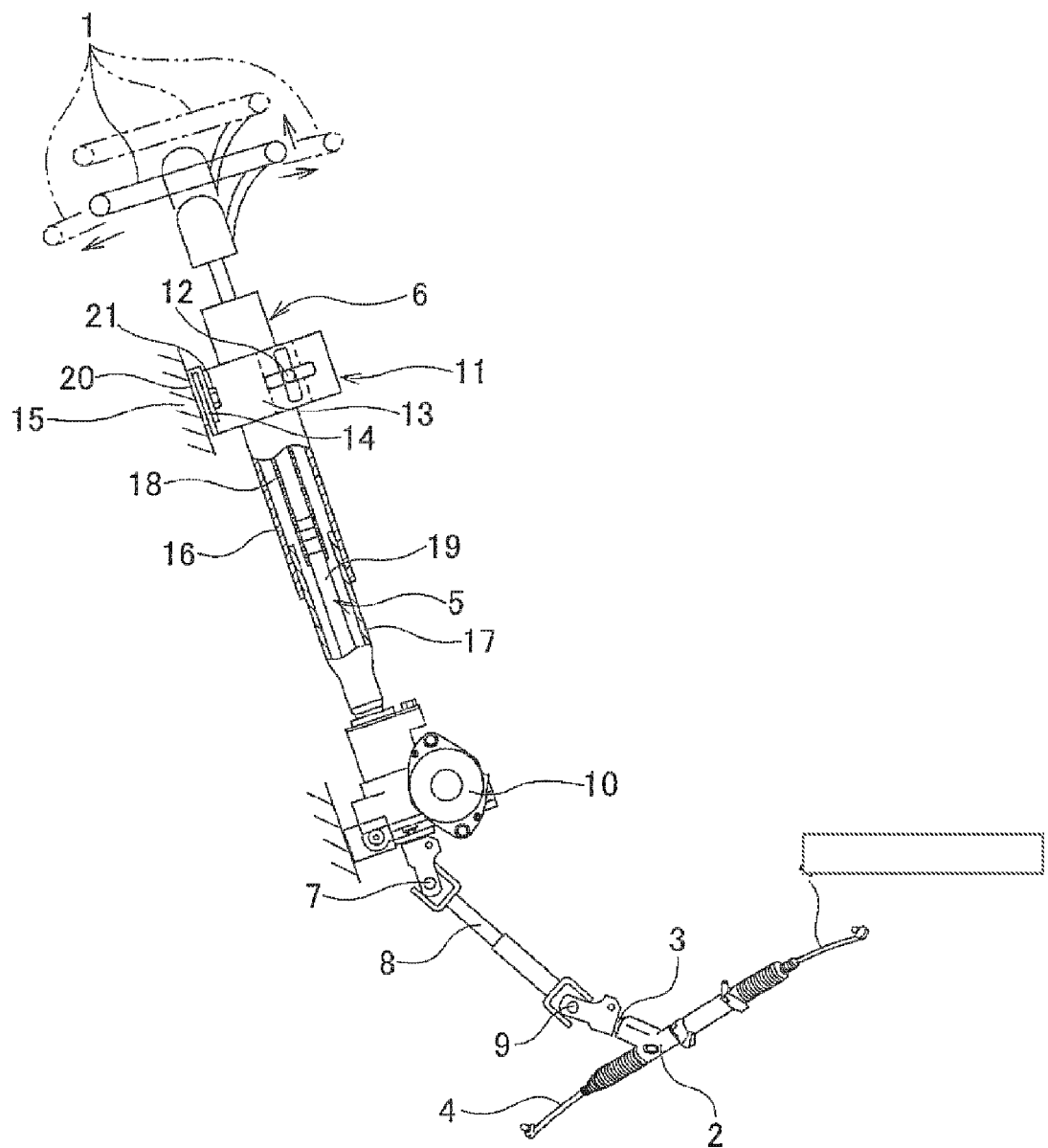
FIG. 19 is a side view with a part cut away of an example of a conventional steering apparatus.

FIG. 1 to FIG. 5 illustrate a first example of an embodiment of the present invention. A feature of this example is achieving construction of an impact absorbing steering apparatus and the energy absorbing members used therein that make is possible to more completely protect the body of the driver that collides with the steering wheel (see FIG. 19) by reducing the impact load that the energy absorbing members 22b absorb during a secondary collision at the instant that the secondary collision occurs, and gradually increasing that as the secondary collision advances. The construction and functions of the other parts are the same as in a conventional steering apparatus, so the following explanation will center on the features of the present invention. The construction of the energy absorbing members 22b and the impact absorbing steering apparatus of this example can be applied regardless of whether or not there is a tilt mechanism or telescopic mechanism. Moreover, when embodying the present invention, including this example, basically, the pair of locking capsules 20a and the energy absorbing members 22b are constructed so as to have left-right symmetry, so in the following explanation, only the construction of the left side of the forward traveling vehicle is illustrated and explained. In this case, the construction of the right side of the forward traveling vehicle is mirror-symmetrical with the construction in the figures.

Figure 3:
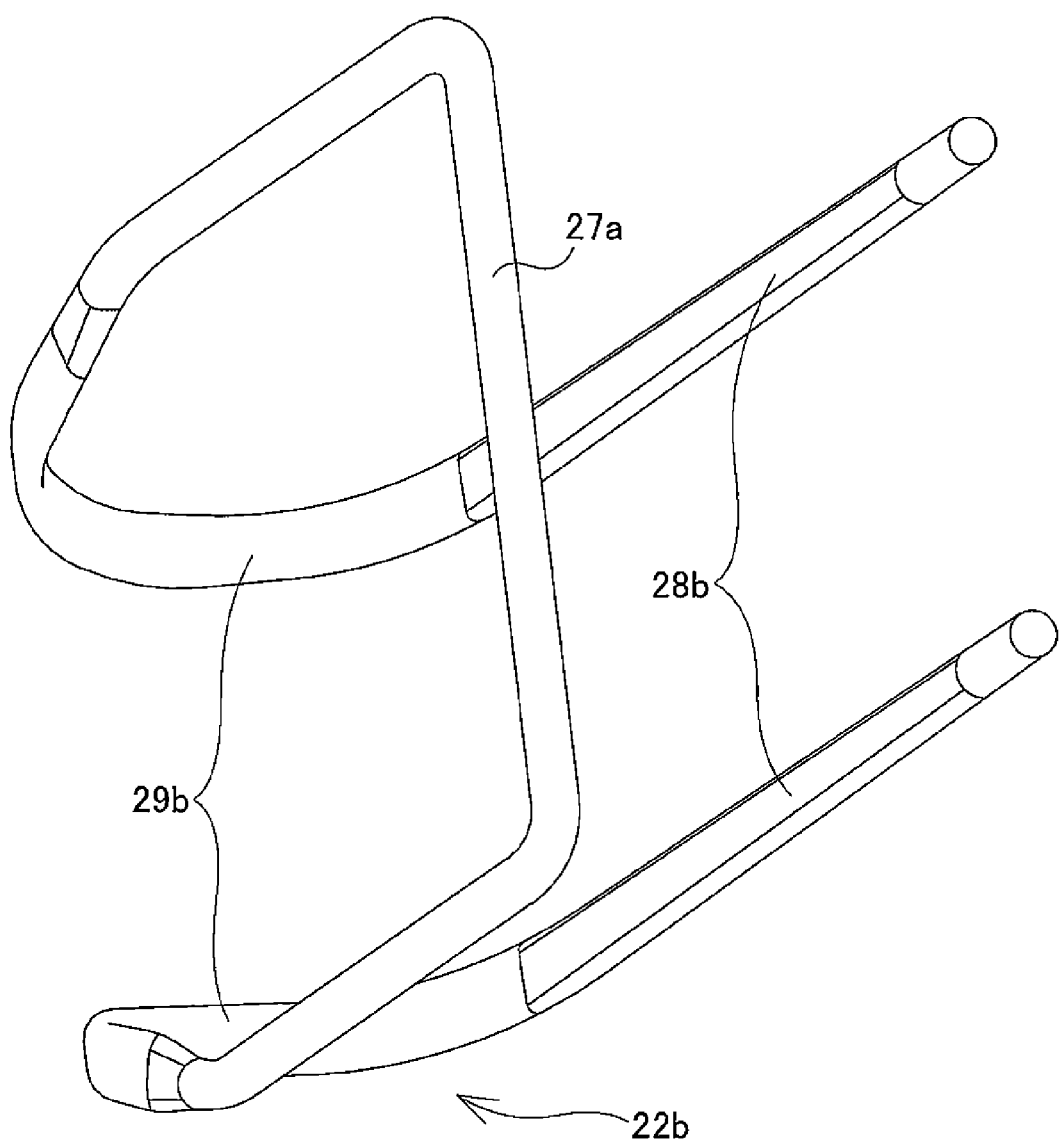
FIG. 3 is a perspective drawing of the energy absorbing member illustrated in FIG. 1 that has been removed.
Figure 4:
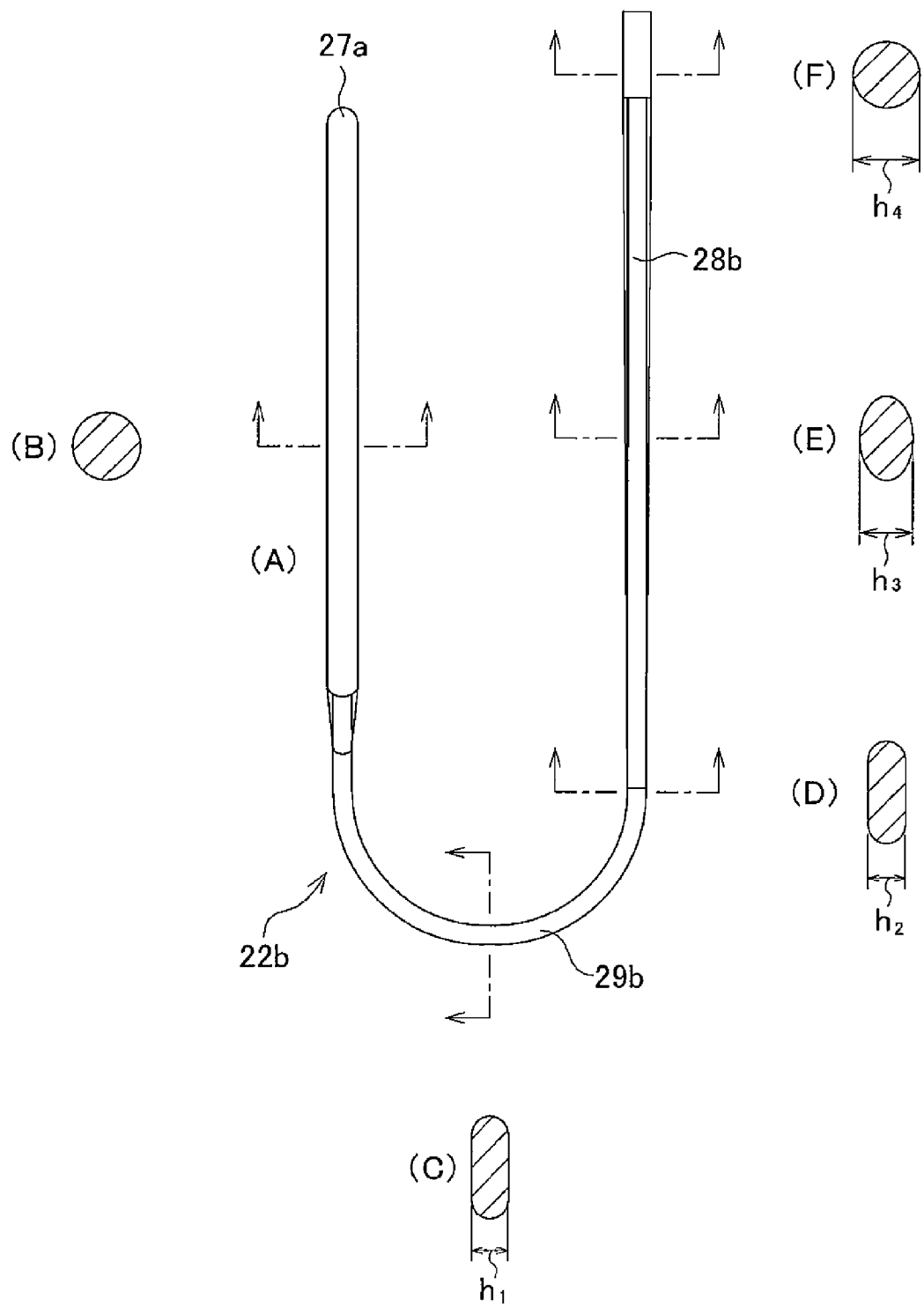
FIG. 4A is a side view of the energy absorbing member illustrated in FIG. 3, and FIG. 4B to FIG. 4F are each cross-sectional drawing of corresponding sections.
Figure 5:
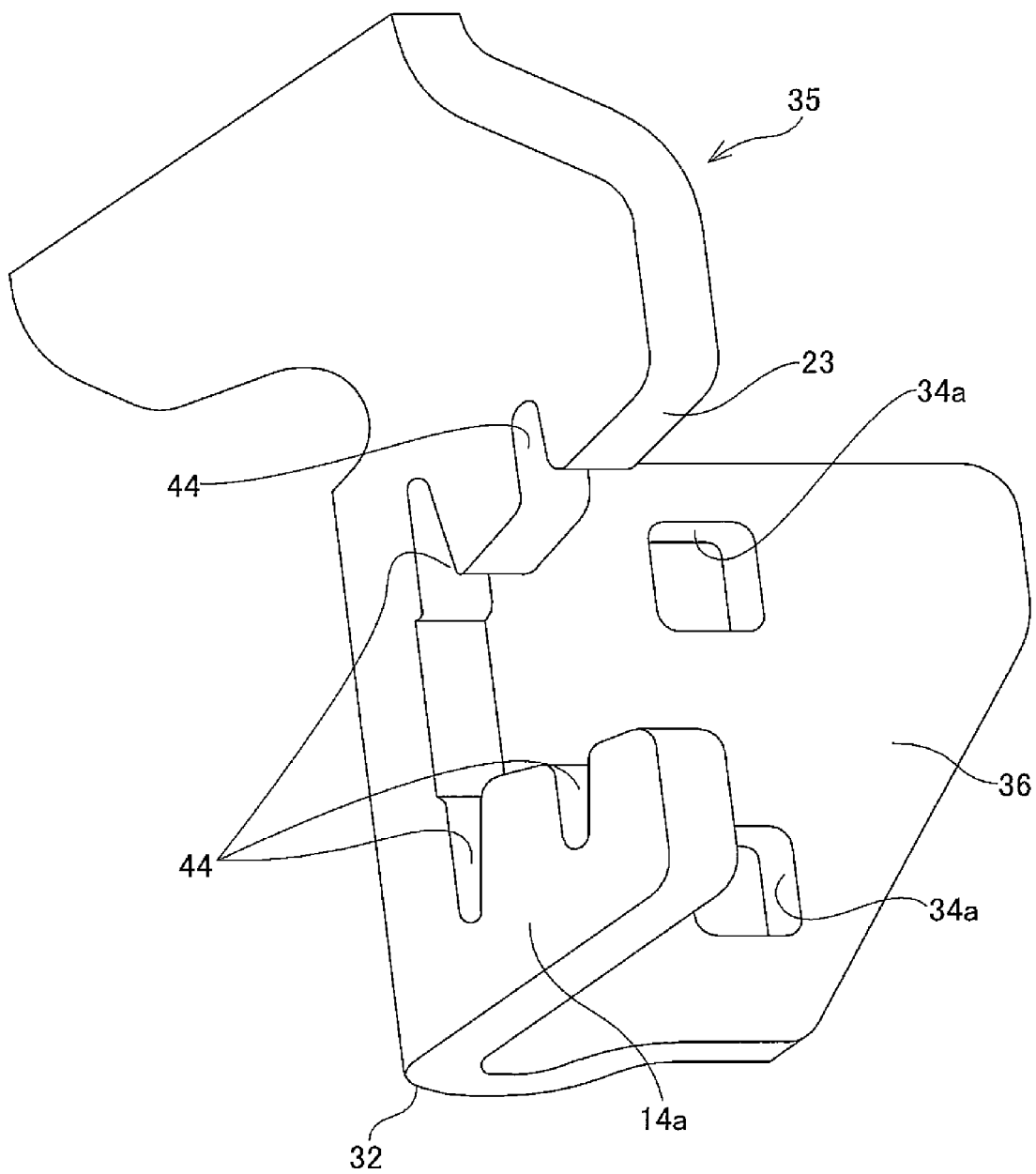
FIG. 5 is a perspective drawing illustrating only half of a rear-side support bracket that has been removed from FIG. 1.
Figure 6:
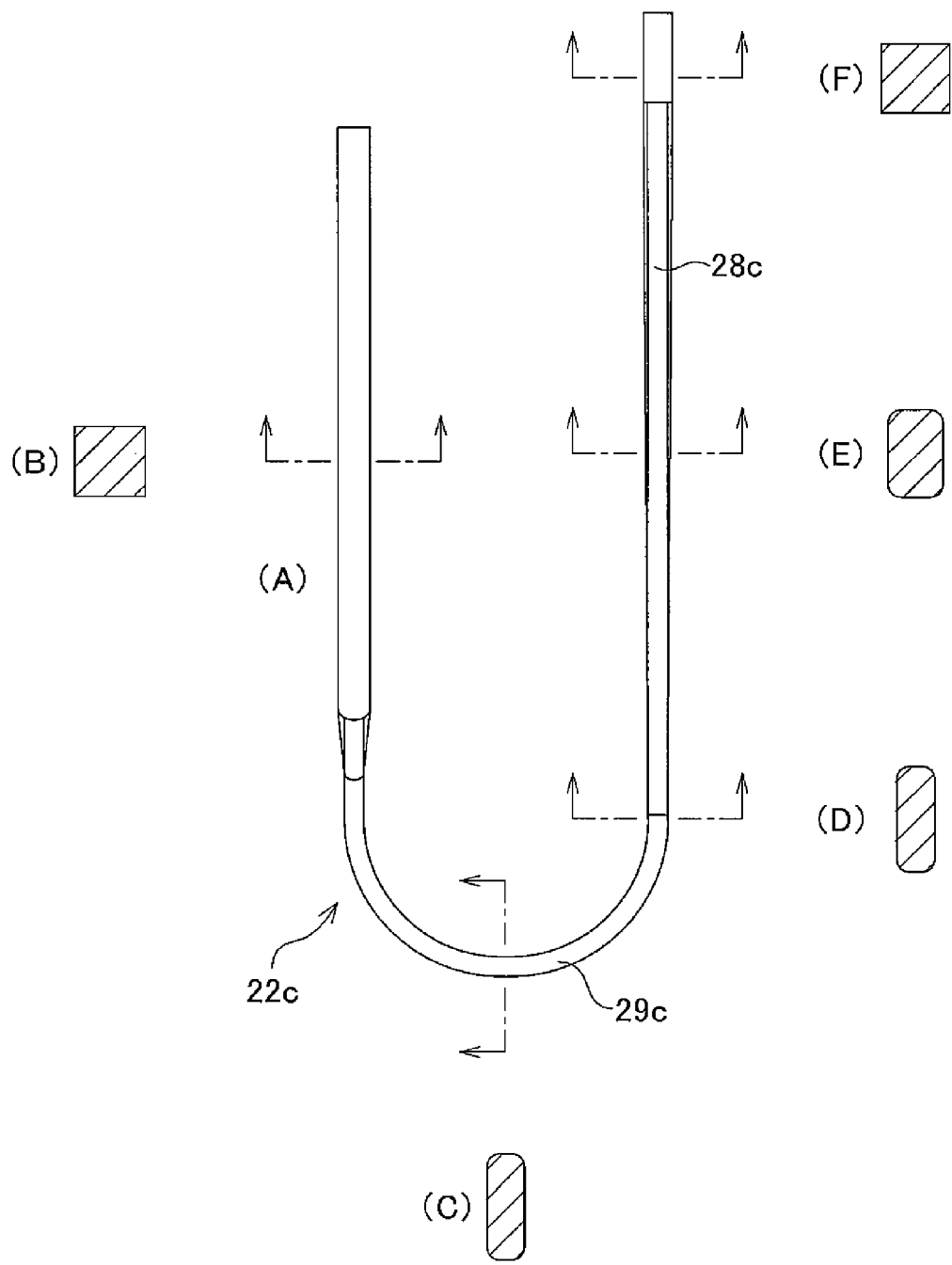
FIGS. 6A to 6F are drawings similar to FIG. 4A to 4F and illustrate an energy absorbing member of a second example of an embodiment of the present invention.

In this example, each of the energy absorbing members 22b is made into a shape as illustrated in FIG. 3 by bending a metal wire having a circular cross-sectional shape and pressing a part thereof. In other words, the energy absorbing member 22b is constructed so as to have U shape when seen in the planar view, by providing a base section 27a in the center section of the metal wire that extends in the width direction and a pair of right and left impact absorbing sections 28b that are formed by bending both ends of the base section 27a into the same direction such that each of the base end sides thereof are continuous with the base section 27a. Bent back curved sections 28b that are bent back into a U shape as seen from the side, are provided in the middle sections of each of the impact absorbing sections 28b. In other words, the impact absorbing sections 28b are composed of continuous sections that extend in one direction from the base end section 27a, bent back curved sections 29b that are continuous with the continuous sections on the base end side thereof, and tip end sections that extend in the direction opposite the one direction from the tip end sides of the bent back curved sections 29b, and the tip ends of the impact absorbing sections 28b are free ends that face in the direction opposite the one direction.

In the example in the figure, by bending the continuous sections between the pair of bent back curved sections 29b and the base section 27a in a direction toward each other, the distance between the bent back curved sections 29b is reduced. As a result, with the base end section 27a fitted onto the locking capsule 20a, the engagement between the base end section 27a and the locking capsule 20a is such that they do not accidentally come apart, and the work of attaching the rear-side support bracket 35 to the vehicle side bracket 15 is simplified.

Moreover, the portions of the impact absorbing sections 28 that are closer to the tip end side than the bent back curved sections 29b are pressed, so that height "h" of the energy absorbing member 22b with respect to the convex curved stroking surface of the stroking section 32a (height in the radial direction of the convex curved surface) gradually becomes higher going toward the rear end edge of the portions on the tip end side of the impact absorbing sections 28b ($h_1 = h_2 < h_3 < h_4$). In other words, of the portions from the bent back curved sections 29b to the tip end edges (rear end edges) of the impact absorbing sections 28b, the bent back curved sections 29b that are stroked first by the stroking sections 32a due to displacement in the forward direction of the steering wheel 1 in a secondary collision are pressed the most. Also, the amount of pressing gradually decreases going in the direction from the continuous sections with the bent back curved sections 29b toward the tip end sides, which are the free ends, of the energy absorbing sections 28b, and the amount of pressing on the tip ends of the impact absorbing sections 28b is zero. That is, while the metal wire has the same cross-sectional area along the entire length, the height "h" of the metal wire is changed so as to increase the section modulus (bending rigidity) gradually. The smaller this height "h" is, the wider the width becomes. In regards to the axis in the width direction of the convex curved surface, which is the stroking surface of the stroking section 32a (on the cross-section in the normal direction to the convex curved surface), as long as construction is such that the section modulus of the metal wire gradually increases going in a direction toward the tip end side in at least the portions near to the tip end side than the bent back curved sections, it is possible to employ other construction as well. For example, it is possible to change the section modulus while keeping the cross-sectional area the same by changing the composition of the metal wire, or by changing the conditions for processing the surface of the metal wire.

Figure 20:
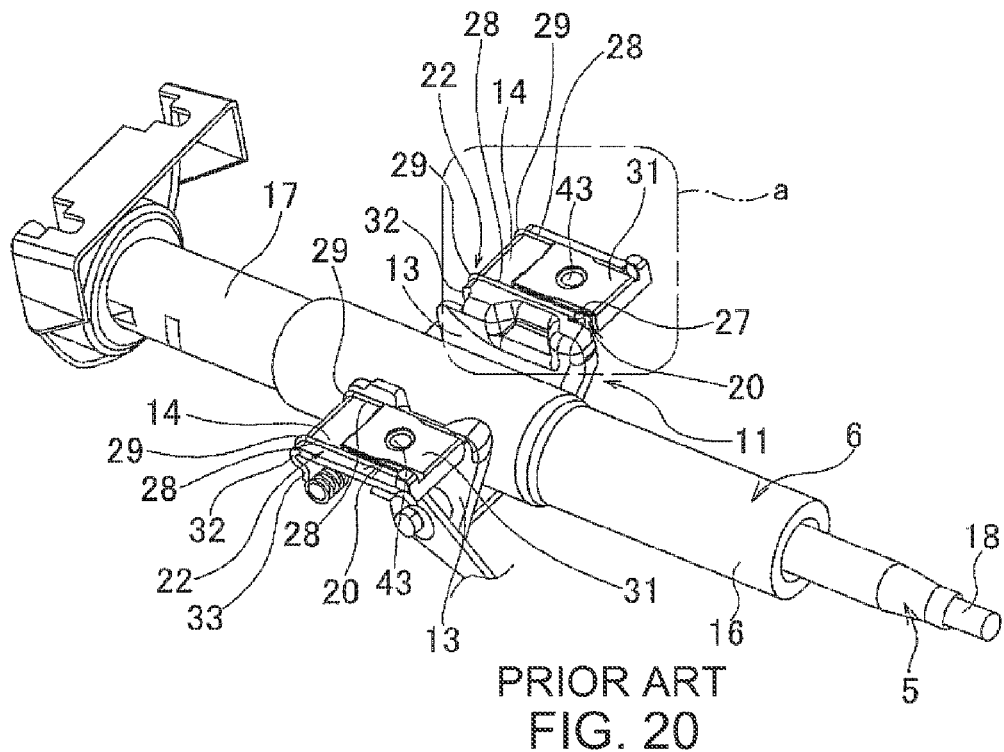
FIG. 20 is a perspective drawing of a first example of conventional construction of an impact absorbing steering apparatus.
Figure 21:
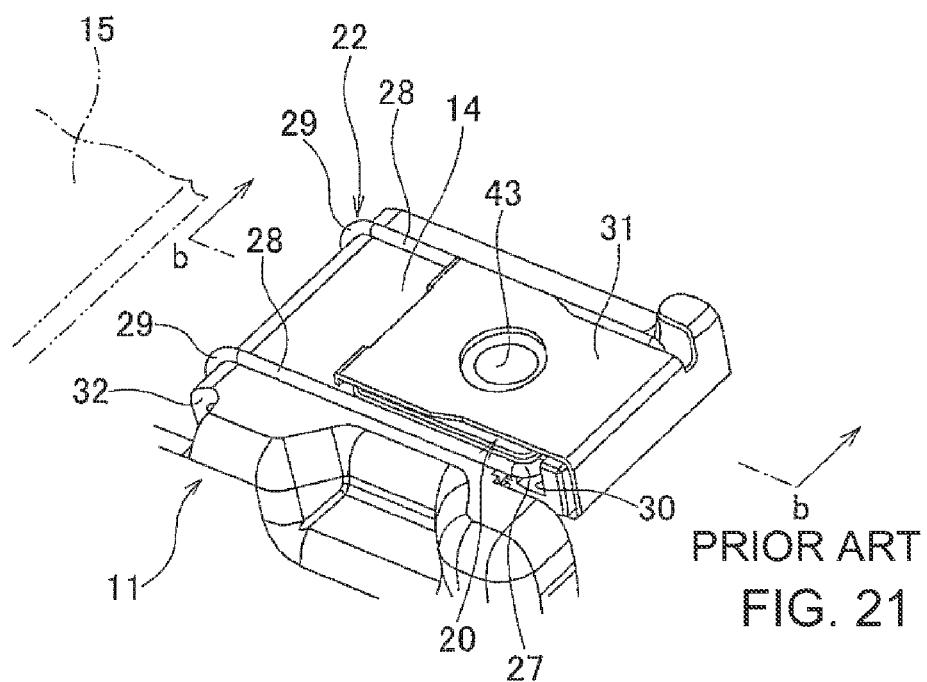
FIG. 21 is an enlarged view of part "a" in FIG. 20.
Figure 22:
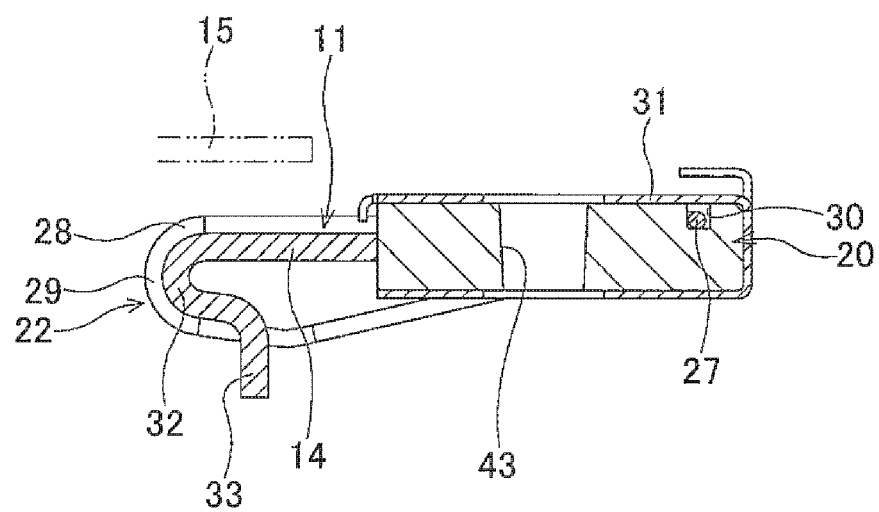
FIG. 22 is a cross-sectional drawing of section "b-b" in FIG. 21.
Figure 23:
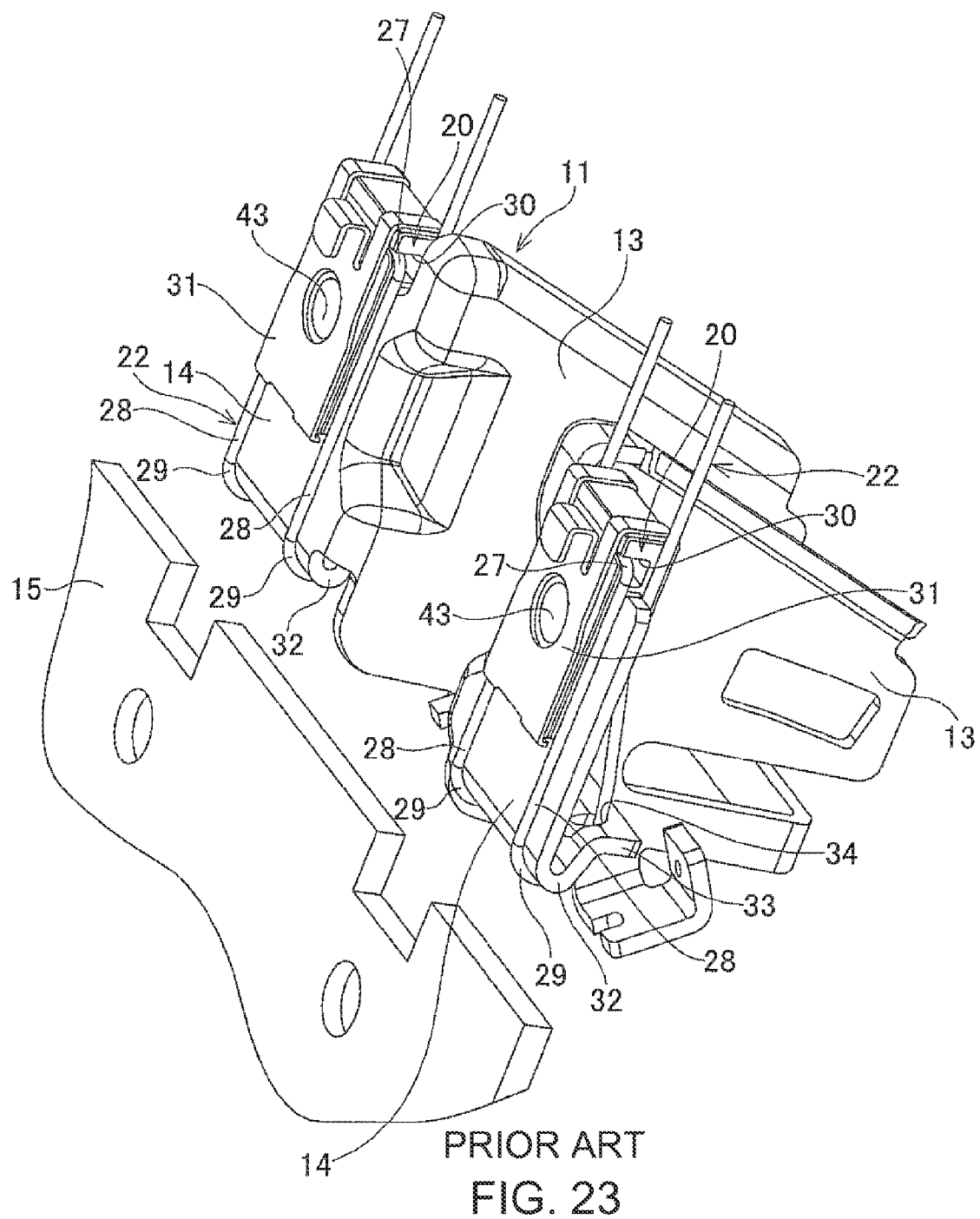
FIG. 23 is a perspective drawing that illustrates a support bracket in which a locking capsule and energy absorbing member are mounted, and that has been removed from the apparatus illustrated in FIG. 20.

In this example, the impact absorbing steering apparatus is constructed by combining the energy absorbing members 22b, the locking capsules 20a, which is the locking member, and rear-side support bracket 35, which is the portion supported by the steering column, as described below. Of the impact absorbing steering apparatus of this example, the rear-side support bracket 35, which is a column-side support bracket that supports the middle section of the steering column 6 (see FIG. 20) is obtained by bending a metal plate having sufficient rigidity, and comprises at least: installation plate sections 14a that are provided on the right and left, stroking sections 32a that are provided on the front end edges of the installation plate sections 14a, downward hanging plate sections 36 that are bent downward from the tip end edges of the stroking sections 32a, and a locking notches 23 that are open on the rear end edge of the installation plate sections 14a. Moreover, each locking capsule 20a, which is a locking member, comprises: locking grooves 24 that are provided on the side surfaces on the right and left and that engage with part of the installation plate sections 14a in the portions on both sides of the locking notches 23, and through holes 43 that are provided in the portions between these locking grooves 24. This locking capsule 20a is fastened to the vehicle-side bracket 15, which is the portion that is fastened to the vehicle, and as in the conventional construction, is fastened by a bolt or stud that is inserted through the through hole 43. Moreover, small notches 44 that open to the locking notch 23 are provided at a plurality of locations (four locations in the example in the figure) in part of the installation plate section 14a in the portions on both sides of the locking notch 23, and small through holes 26 are provided at a plurality of locations (four locations in the example in the figure) in the both end sections of the locking capsule 20a that are aligned with the small notches 44. As in the conventional construction, locking pins span between the small notches 44 and small through holes 26, and when an impact load is applied in the forward direction to the steering column 6, the rear-side support bracket 35 is supported by the vehicle-side bracket 15 so that the steering column 6 and rear-side support bracket 35 can break away in the forward direction.

Figure 1:
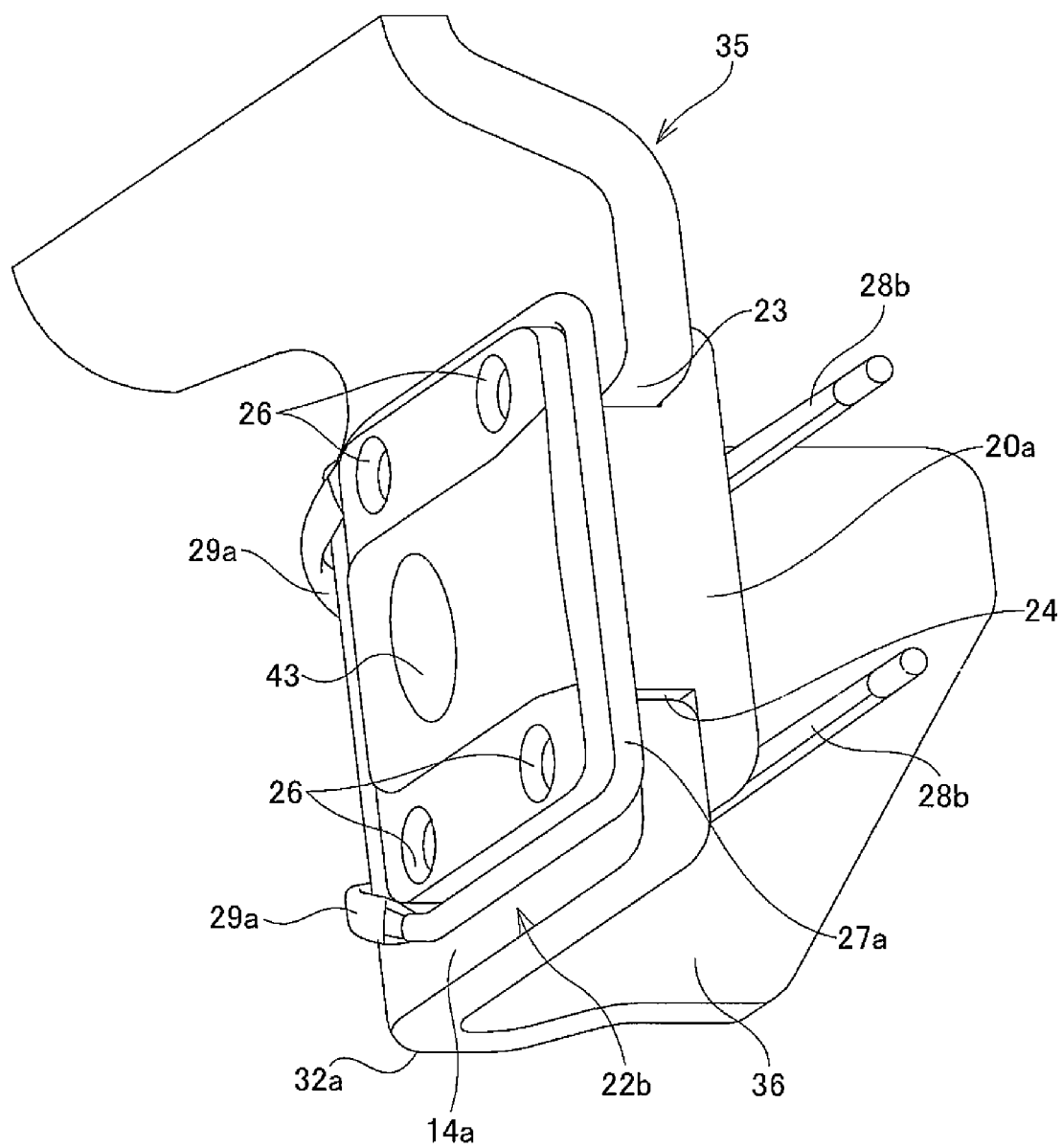
FIG. 1 is a perspective drawing of half of a rear-side support bracket, and illustrates the installed state of an energy absorbing member and locking member in a first example of an embodiment of the present invention.
Figure 2:
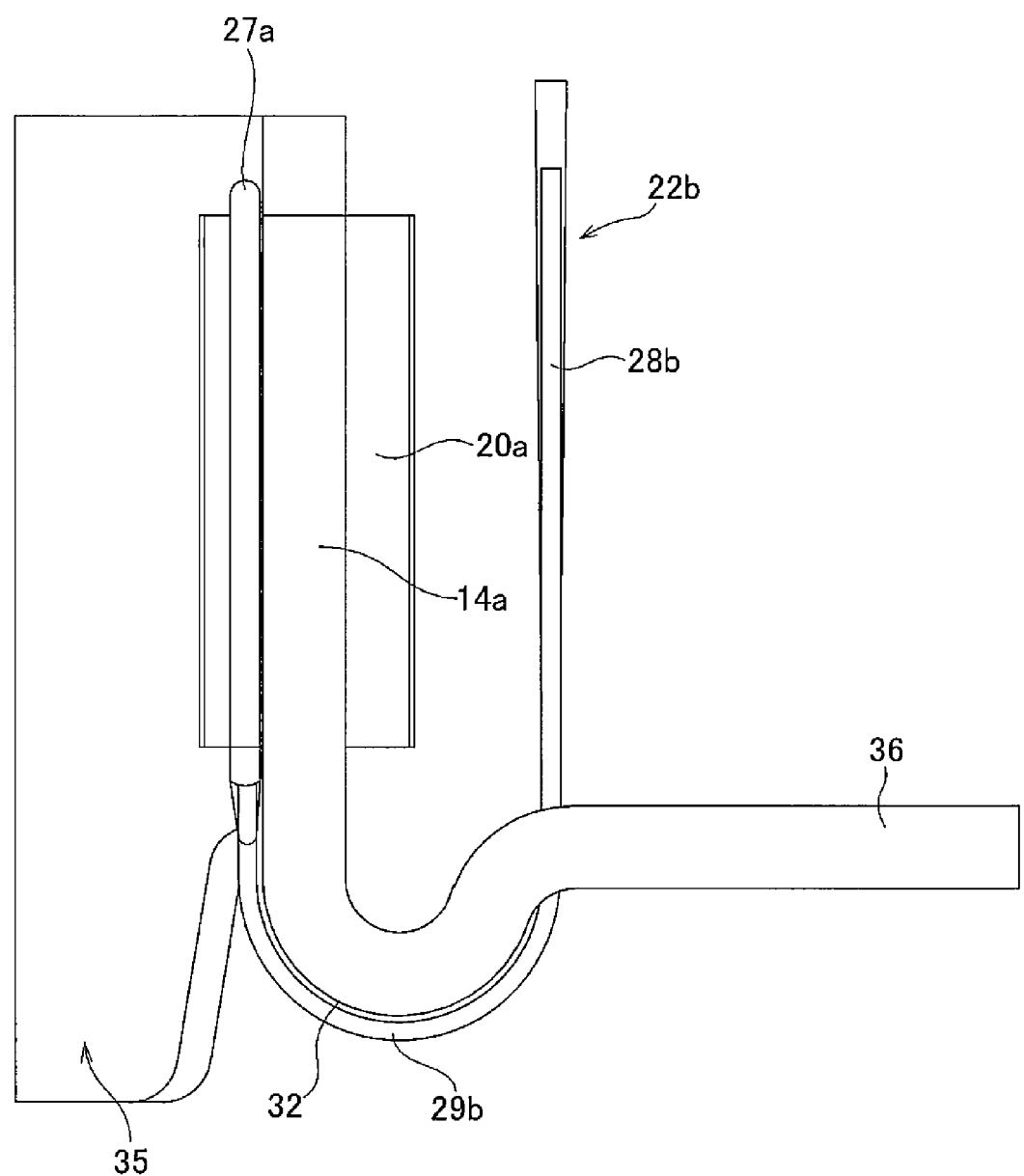
FIG. 2 is a side view of half of the rear-side support bracket in FIG. 1.
Figure 24:
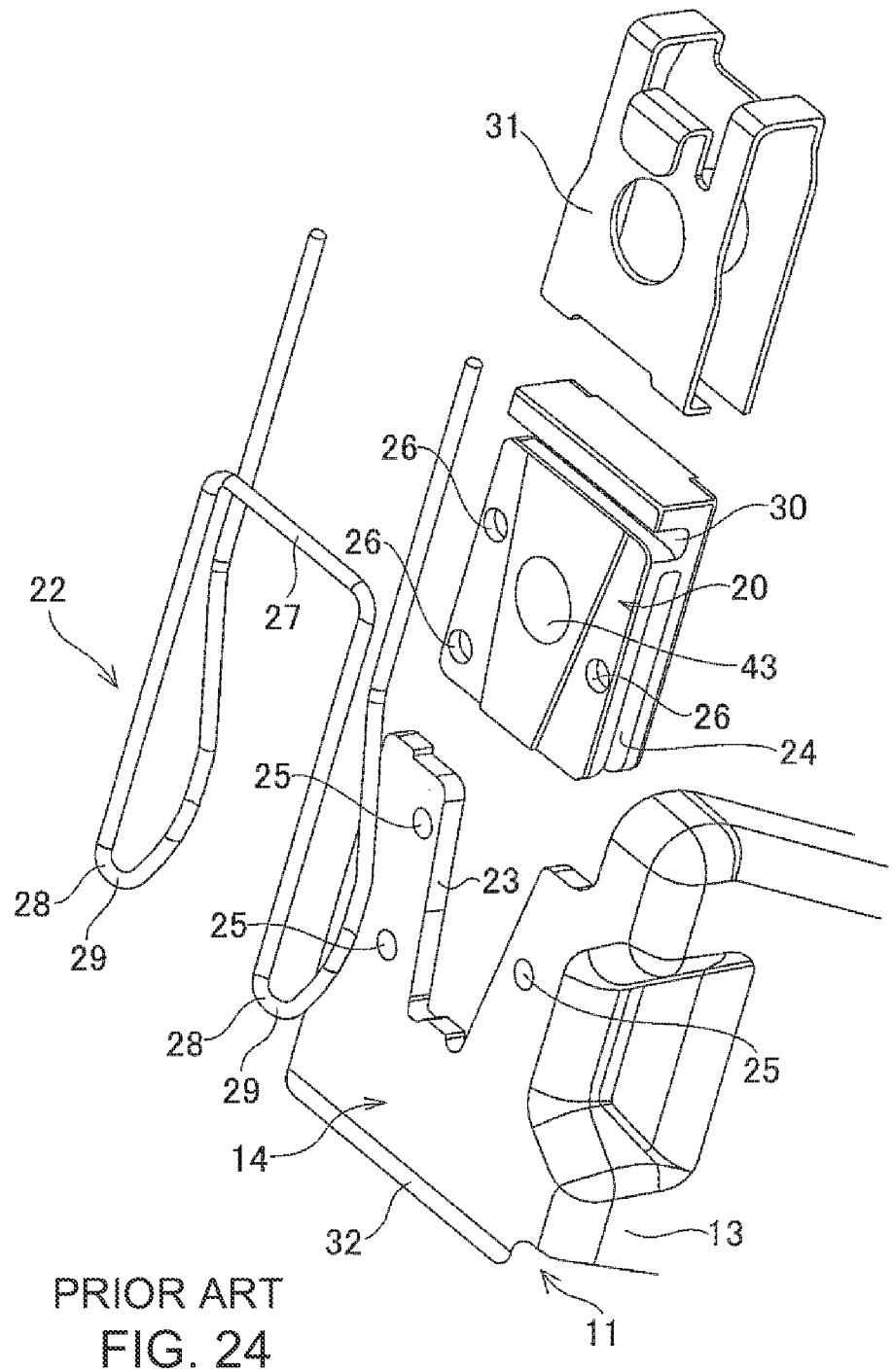
FIG. 24 is a perspective drawing that illustrates a support bracket in which an installation plate section of the support bracket, a locking capsule and energy absorbing member are mounted, and that has been removed from the apparatus illustrated in FIG. 20.
Figure 25:
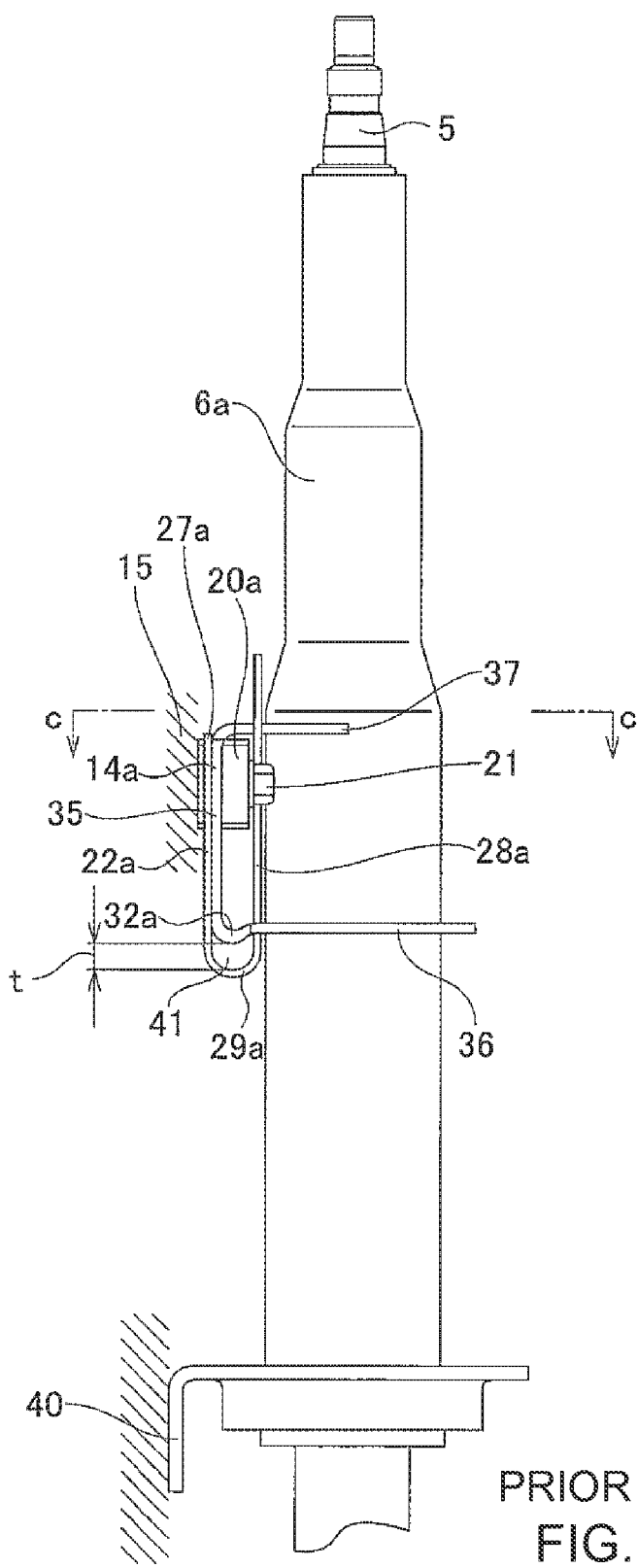
FIG. 25 is a side view of a second example of conventional construction of an impact absorbing steering apparatus.
Figure 26:
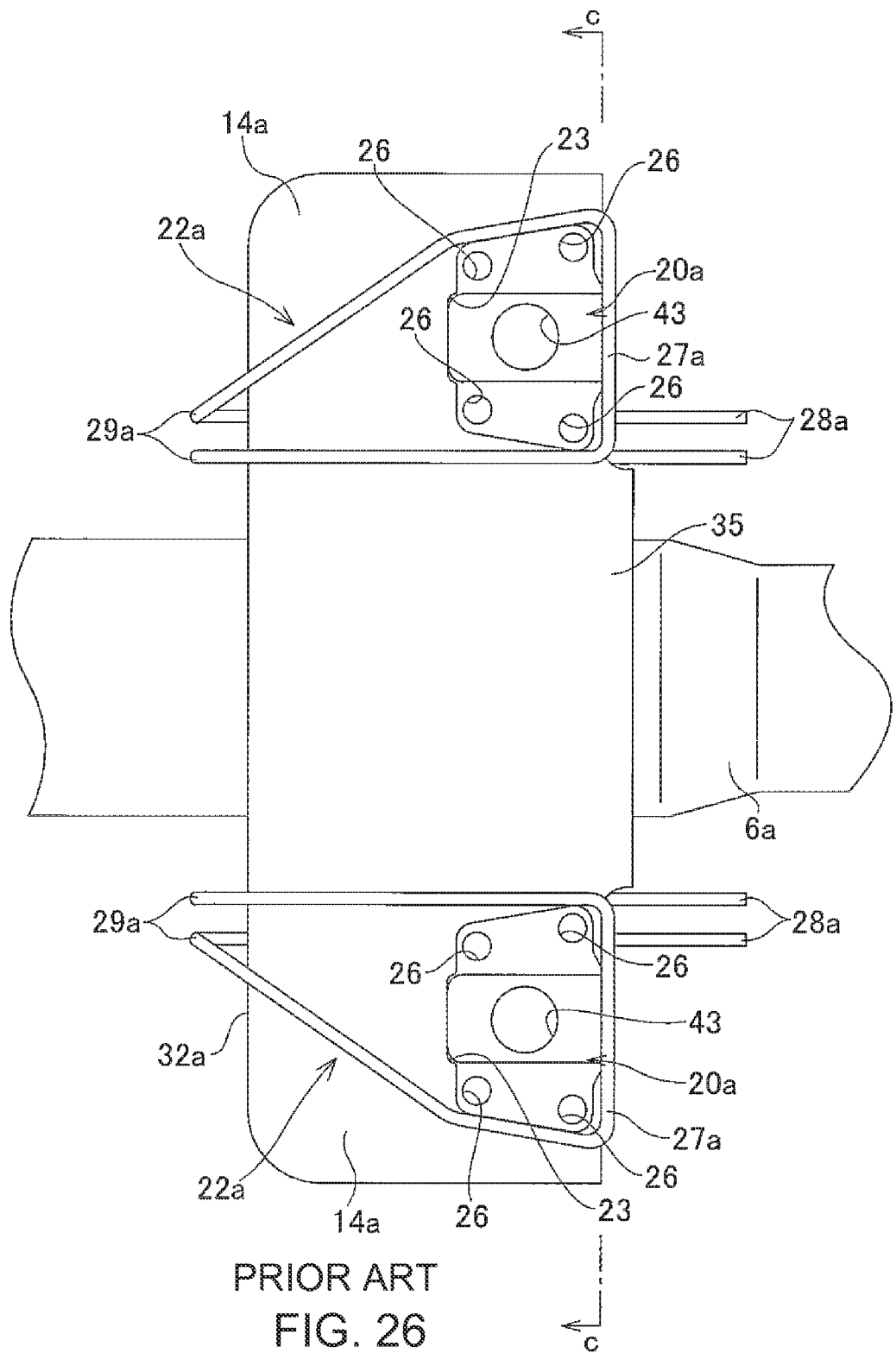
FIG. 26 is a view of the middle section in FIG. 25 as seen from above.
Figure 27:
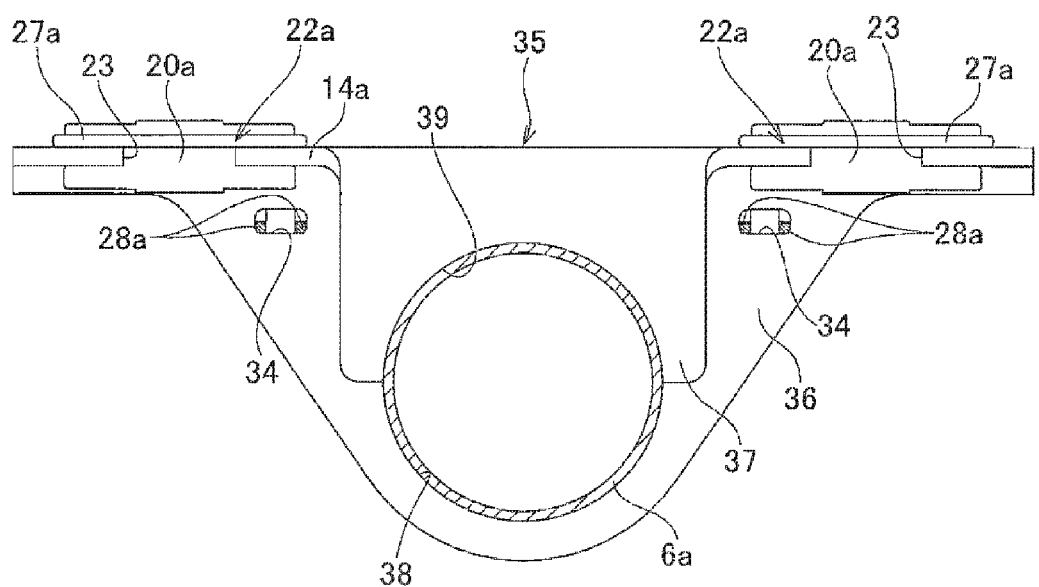
FIG. 27 is a cross-sectional drawing of section "c-c" in FIG. 26.
Figure 28:
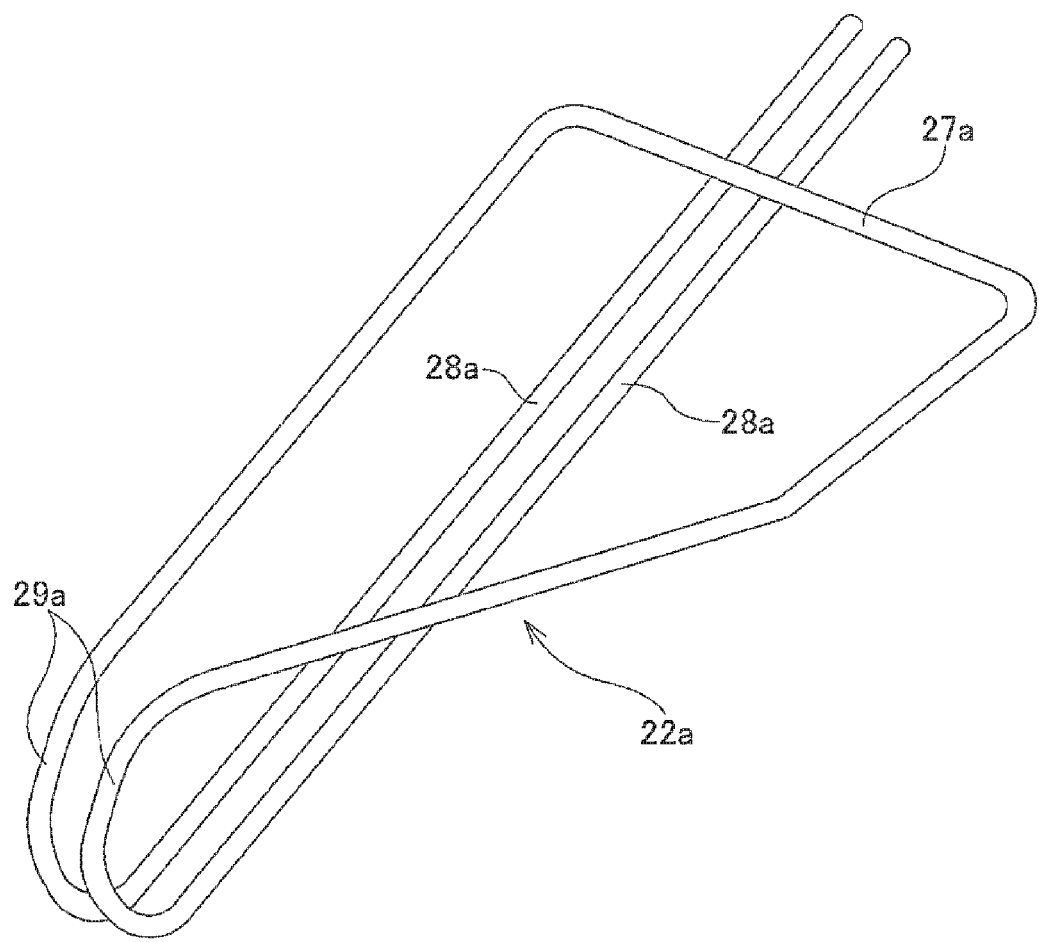
FIG. 28 is a perspective drawing illustrating an energy absorbing member that has been removed from the apparatus illustrated in FIG. 25.

In this example, first, the portions on the tip end sides of the impact absorbing sections 28b of an energy absorbing member 22b are inserted through small through holes 34a that are formed in the front-side downward hanging section 36 of the rear-side support bracket 35. The inner circumferential surface of the small through holes 34a is a square surface. Next, as illustrated in FIG. 1, the base section 27a and the portions of the impact absorbing members 28b that are near the base section 27a are fitted onto a portion of the locking capsule 20a that protrudes from the top surface of the installation plate section 14a. In this state, the base section 27a come in contact with or face the rear end surface of the locking capsule 20a, and the inside surface of the bent back curves sections 29b come in contact with or face the convex curved surface of the stroking section 32a. A locking groove 30 (see FIG. 24) is provided on the rear end section of the locking capsule 20a, and the base section 27a is able to lock in this locking section.

In the construction of this example, by locking the base section 27a of the energy absorbing member 22b to the locking capsule 20a, which is a locking member, the energy absorbing member 22b is arranged between the rear-side support bracket 35 that is supported by the steering column 6n and the locking capsule 20a, which is the portion supported by the vehicle. Therefore, the base section 27a extends in the width direction of the steering apparatus, and the impact absorbing sections 28b continue and extend in the forward direction from both ends of the base section 27a, and then by way of the bent back curved sections 29 as, the tip end sides extend toward the rear. However, it is also possible to lock the energy absorbing member 22b to another structure of the portion that is fastened to the vehicle, and it is also possible to employ other structure of the portion that is supported by the steering column 6 to stroke the bent back curved sections. Moreover, when the base section 27a of the energy absorbing member 22b is locked to a structure that is formed in the portion that is supported by the steering column 6 (steering column, rear-side support bracket 35 and the like) and an impact load is applied in the forward direction to the steering column 6, the bent back curved section 29a can be constructed so that they are stroked by a stroking surface of a stroking section that is formed in the portion that is supported by the vehicle (locking member such as the vehicle-side bracket 15, locking capsule 20a and the like). In that case, the base section 27a is located on the front side of the steering apparatus, and the impact absorbing sections 28b continue and extend toward the rear from both end of the base section 27a, and then by way of the bent back curved sections 29a, the tip end sides extend toward the front.

With the impact absorbing member of the present invention and a steering apparatus in which the energy absorbing member is applied, it is possible to more completely protect the driver during a collision accident when compared with conventional construction. In other words, the height "h" with respect to the stroking section 32 in the portions further on the tip end sides than the bent back curved sections 29b of the impact absorbing sections 28b, which are the portions of the energy absorbing member 22b that are stroked by the stroking sections 32 during a secondary collision, gradually increases going in a direction toward the tip end edges (rear end edges) of the impact absorbing sections 28b, and thus the section modulus gradually increases. Therefore, it is possible to make the amount of impact load that is absorbed by the energy absorbing member 22b at the instant that a secondary collision occurs small, and to gradually increase that amount as the secondary collision advances.

Moreover, by making the inner circumferential surface of the small through holes 34a through which the portions on the tip end sides of the impact absorbing sections 28b are inserted square surfaces, the top and bottom surfaces of the inner circumferential surface of the small through holes 34a, which are the portions that rub with the impact absorbing sections 28b when the portions on the tip end side of the impact absorbing sections 28b are pulled during a secondary collision, are flat surfaces. Therefore, the portions on the tip end side of the impact absorbing sections 28b can be smoothly fed in the forward direction through the small through holes 34a. In other words, in this example, of the portions on the tip end side of the impact absorbing members 28b, the portions from the bent back curved sections 29a to the middle sections becomes wide, so when both the top and bottom surfaces of the small through holes 34a are constructed so as to be partial cylindrical surfaces having a small radius of curvature, there is a possibility that these wide portions will get caught on the end edges of the small through holes 34a, and that feeding the portions on the tip end side of the impact absorbing sections 28b will not be able to be performed smoothly. In the case of this example, it is possible to smoothly feed the portions on the tip end side of the impact absorbing sections 28b in the forward direction without getting caught in this way.

In the example in the figures, the energy absorbing member 22b is formed using a metal wire, which is a wire member, using a metal material that is plastically deformable, however, the energy absorbing member of the present invention is not limited to this, for example, the impact absorbing sections can be constructed by bending one end section of the long metal plate material in the forward-backward direction in either the up or down direction to form a base section, bending back the remaining middle section into a U shape, and continuing from the base section and extending in the forward direction, with the tip end sides extending toward the rear, and having bent back curved sections in the middle section that are bent back in a U shape. Moreover, it is possible to prepare a U-shape metal band material beforehand, and construct a pair of right and left impact absorbing sections. Furthermore, it is possible to arrange the energy absorbing member sideways so that the base section extends in the up-down direction instead of the width direction, and so that the bent back curved sections are in a U shape as seen from the top.

Second Example

FIGS. 6A to 6F illustrates a second example of an embodiment of the present invention. In this example, the energy absorbing member 22c is constructed by bending a metal wire having a rectangular cross-sectional shape. Of the pair of impact absorbing sections 28c, the portions from the bent back curved sections 29c that are provided in the middle sections to the edges on the tip ends (rear end edges) are pressed so that the height of the impact absorbing sections 28c with respect to the stroking section 32a (see FIG. 2) gradually increases going in a direction toward the edges on the tip ends (rear end edges). The construction and functions of the other parts are the same as in the first example.

Third Example

Figure 7:
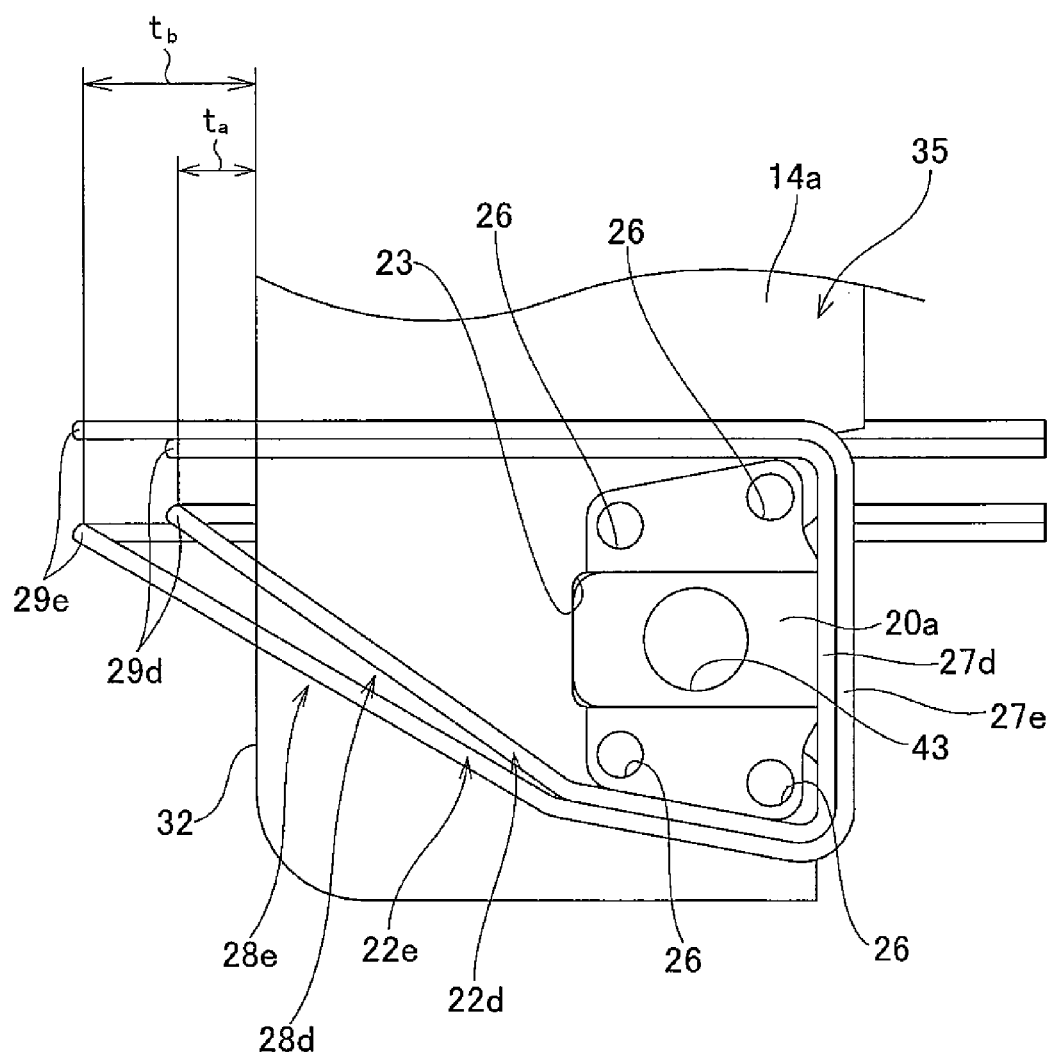
FIG. 7 is a top view of half of a rear-side support bracket that illustrates the installed state of the energy absorbing member and locking member in a third example of an embodiment of the present invention.
Figure 8:
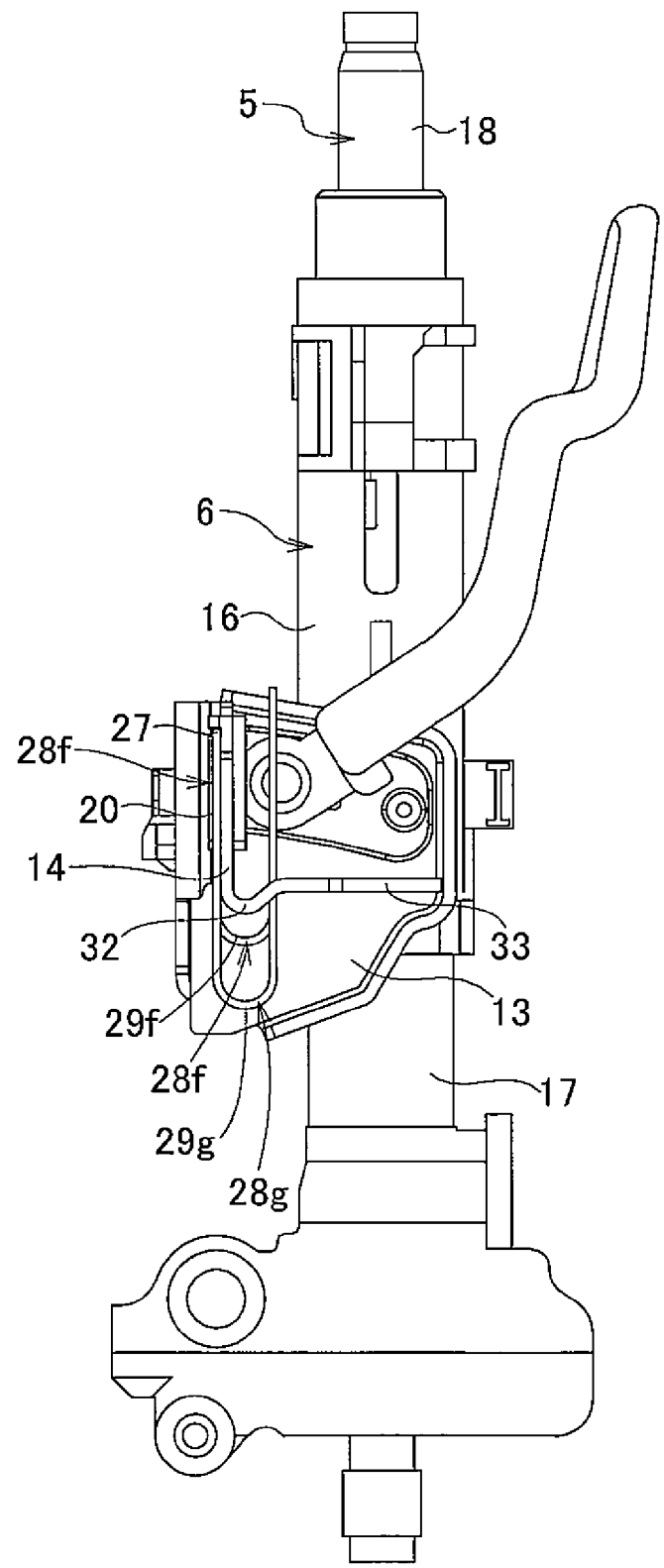
FIG. 8 is a side view of a steering apparatus that illustrates a fourth example of an embodiment of the present invention.
Figure 9:
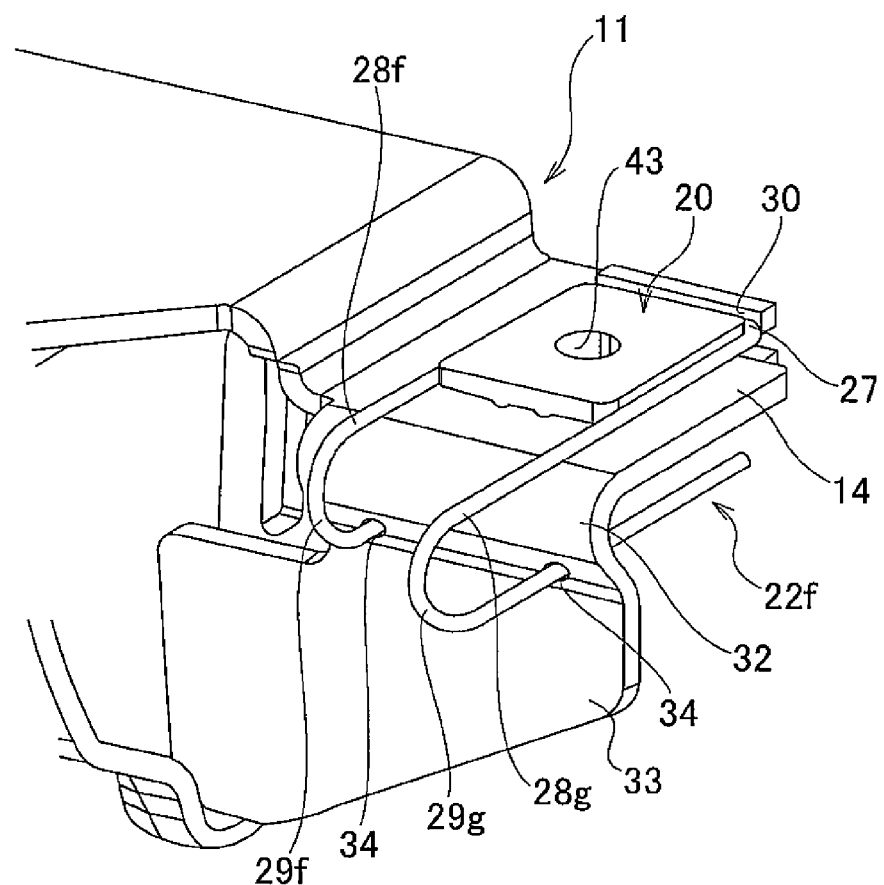
FIG. 9 is a perspective drawing of the center section of FIG. 8.
Figure 10:
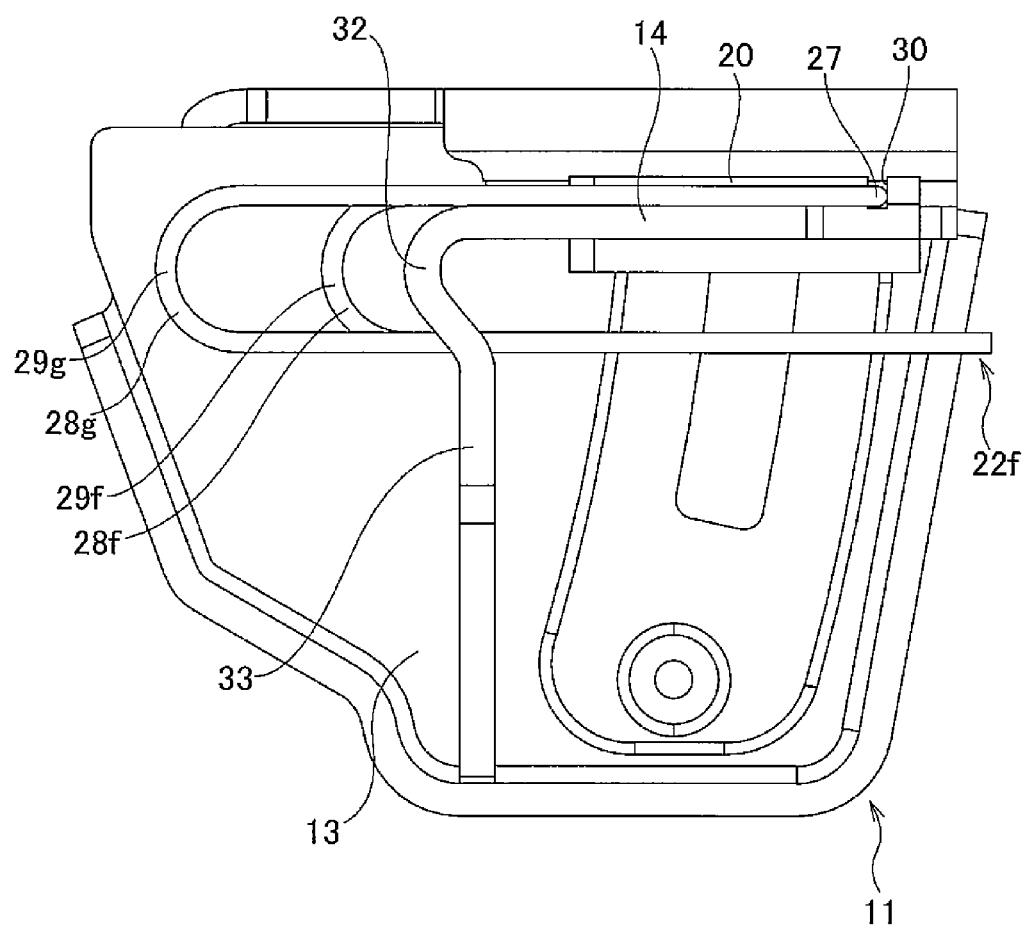
FIG. 10 is a side view of the center section of FIG. 8.
Figure 11:
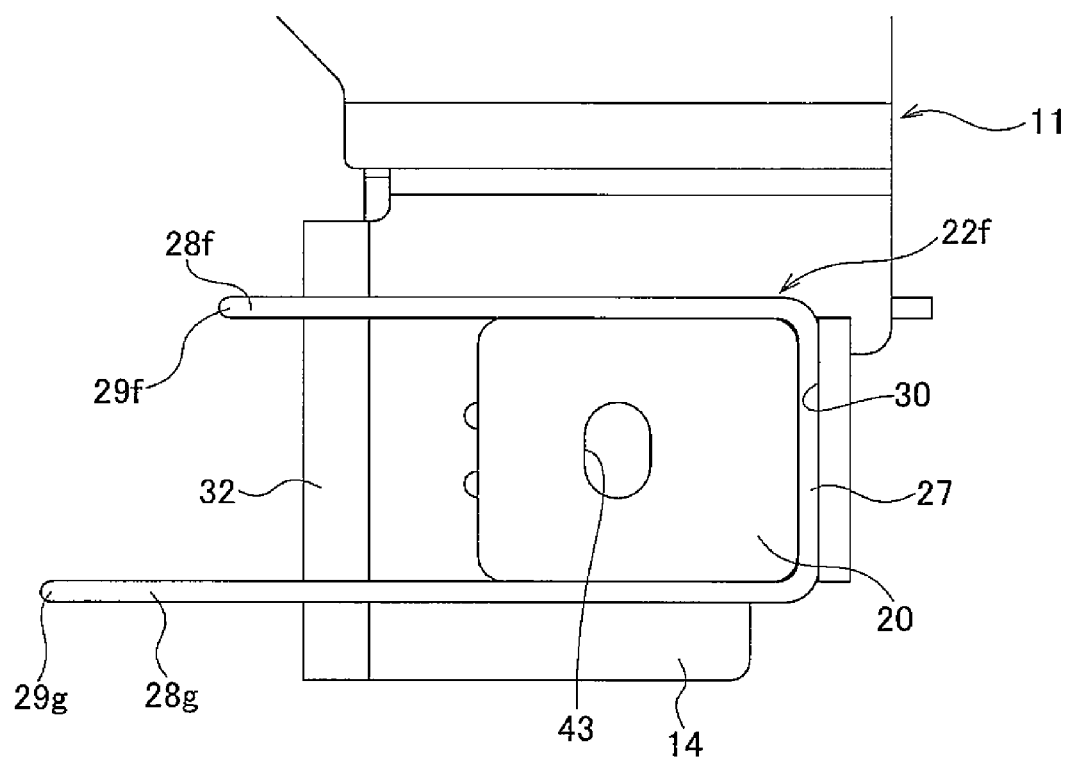
FIG. 11 is a top view of the center section of FIG. 8.
Figure 12:
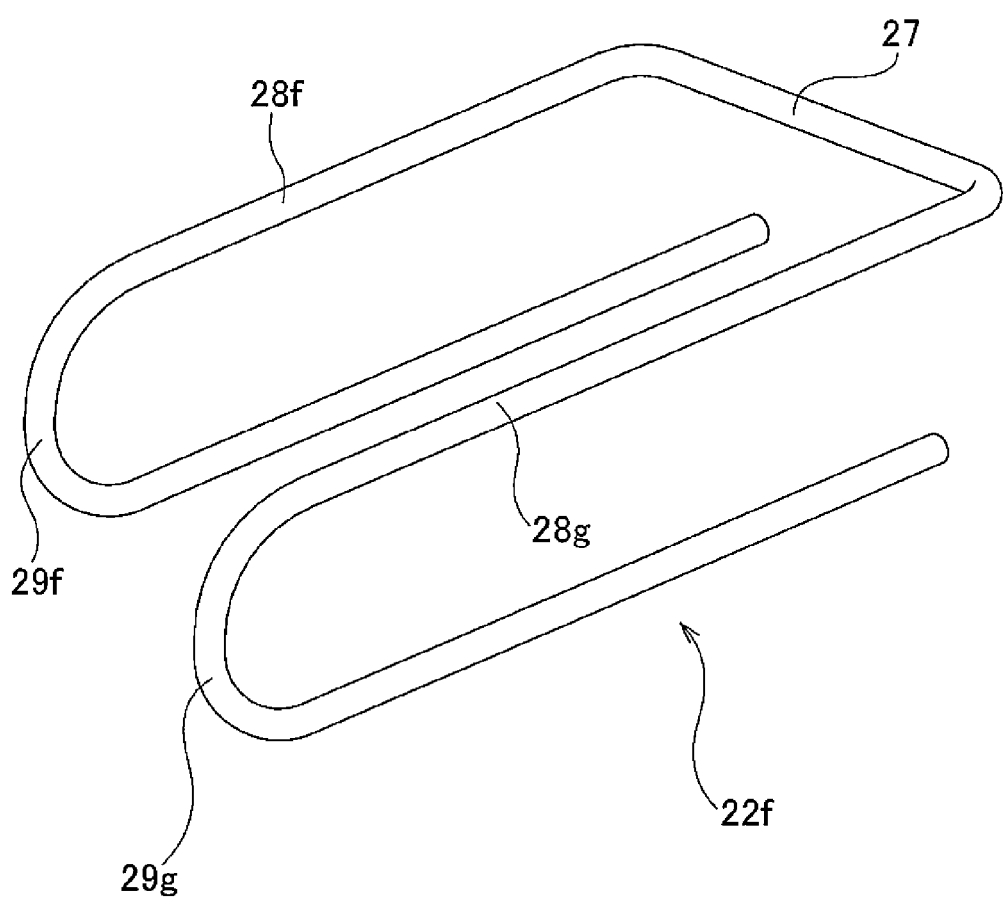
FIG. 12 is a perspective drawing of the energy absorbing member of FIG. 8 that has been removed.

FIG. 7 illustrates a third example of an embodiment of the present invention. In this example, a pair of energy absorbing members 22d, 22e having different sizes is mounted on each end section on both the right and left ends of the installation plate sections 14 of the rear-side support bracket 35. The distance "$t_a$" from the bent back curved sections 29d that are formed in one energy absorbing member 22d to the stroking section 32 that is formed on the front end edge of the installation plate section 14, and the distance "$t_b$" from the bent back curved sections 29e that are formed in the other energy absorbing members 22e to the stroking section 32 are different from each other.

Moreover, in this example, as in the second example, one impact absorbing section 28d, 28e is bent in the middle section between the base section 27d, 27e and the bent back curved section 29d, 29e of the impact section 28d, 28e so that the distance between the bent back curved sections 29, 29e and the between and the portions on the tip end side of the impact absorbing sections 28d, 28e becomes closer. The portions on the tip end side of the impact absorbing sections 28d, 28e are inserted through one small through hole 34 that is formed in the front-side downward hanging plate section 36 of the rear-side support bracket 35 (see FIG. 5).

In the case of this example in which energy absorbing members 22d, 22e having different shapes are arrange in parallel in this way, after stroking of the bent back curve sections 29d of one energy absorbing member 22d starts, stroking of the bent back curved sections 29e of the other energy absorbing member begins. In other words, in this example, by combining the energy absorbing members 22d, 22e, it is possible to change the energy absorbing characteristics during a secondary collision. In order to further adjust the energy absorbing characteristics, preferably one or both of the pairs of energy absorbing members 22d, 22e on the right and left is constructed using the energy absorbing member of the first or second example of the embodiment. The number of combined energy absorbing members is arbitrary and is not limited to one pair for each installation plate section on the right and left, and it is possible to provide three or more energy absorbing members for each installation plate section on the right and left. In this case, at least one energy absorbing member of each installation plate section on the right and left is an energy absorbing member of the first or second example of the embodiment. The construction and functions of the other parts are the same as in the first and second examples of the embodiment.

Fourth Example

FIG. 8 to FIG. 12 illustrates a fourth example of an embodiment of the present invention. One feature of this example, which is construction of an impact absorbing steering apparatus and energy absorbing member used therein for making the amount of impact load that is absorbed by the energy absorbing member at the instant that a secondary collision occurs small, is common with the first and second examples of the embodiment of the present invention, however, another feature, which is improving the impact absorbing characteristics in the initial state of a secondary collision by making the forward-backward position of the bent back curved sections 29f, 29g that are provided respectively in the middle sections of the pair of impact absorbing sections 28f, 28g on the right and left of the energy absorbing member 22f different from each other, differs from the first and second examples of the embodiment of the present invention. Although the construction of this example relates to an aspect different from the aspect that includes the first and second example, however, the construction of the first or second examples of the invention, and further the construction of the third example can be simultaneously applied with the construction of this example, and these constructions as well are included within the scope of the present invention. The construction and functions of the other parts of this example are the same as in the first example of conventional construction and in the first example of an embodiment the present invention.

In the energy absorbing member 22f of this example, the forward-backward positions of the bent back curved sections 29f, 29g that are provided in the middle sections of the pair of right and left impact absorbing sections 28f, 28g of the energy absorbing member 22f differ from each other. In other words, a first bent back curved section 29f that is provided in the middle section of one impact absorbing section (first absorbing section) 28f is located further toward the rear than a second bent back curved section 29g that is provided in the middle section of the other impact absorbing section (second impact absorbing section) 28g.

Figure 13:
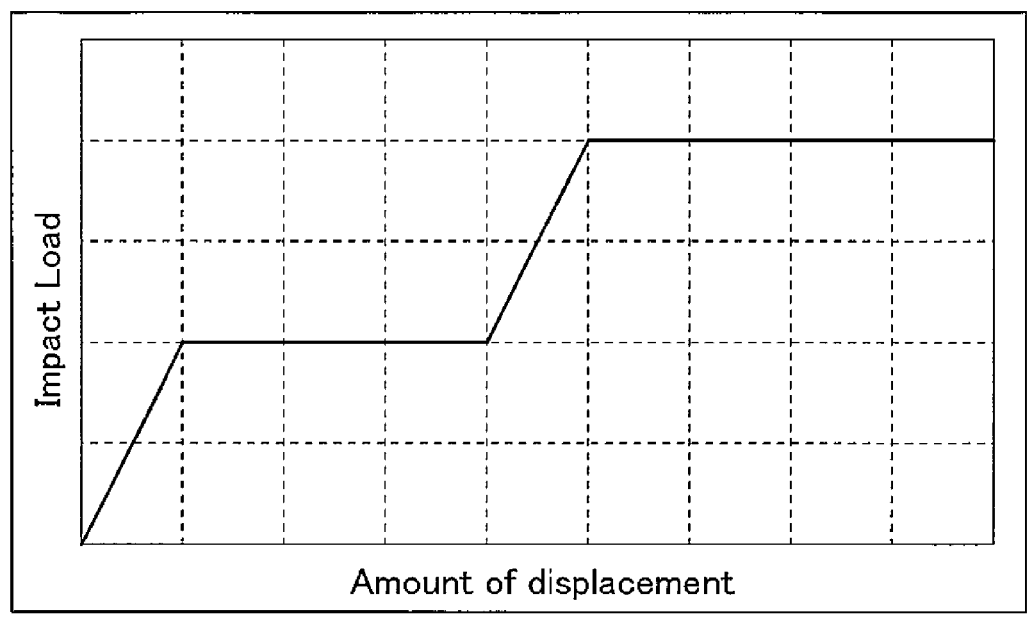
FIG. 13 is a graph illustrating the relationship between the amount of displacement in the forward direction of the steering wheel during a secondary collision and the impact load required for causing the energy absorbing member to plastically deform.

The construction described above is employed, so in the case of the construction of this example, when the support bracket 11 displaces in the forward direction together with the steering column 6 during a secondary collision, first, the bent back curved section 29f is stroked by the stroking section 32 that is provided in the front end edge section of the support bracket 11, and starts to move toward the tip end side of the impact absorbing section 28f. Then, after the support bracket 11 has moved a little in the forward direction, the bent back curved section 29g begins to be stroked by the stroking section 32. As a result, the relationship between the amount that the steering wheel 1 (see FIG. 19) displaces in the forward direction during a secondary collision and the impact load required for energy absorbing members 22f, 22g to plastically deform becomes as illustrated in FIG. 13. In other words, immediately after a secondary collision begins to occur, only the impact absorbing section 28f is plastically deformed, so the load required for causing the steering wheel 1 to displace in the forward direction is kept low, and thus it is possible to lessen the impact that is applied to the body of the driver immediately after a secondary collision begins to occur. Then, as the secondary collision advances, the bent back curved section 29g that is provided in the middle section of the impact absorbing section 28g begins to plastically deform, which causes the load required for causing the steering wheel 1 to displace in the forward direction to increase. As a result, it is possible to maintain the absorbed amount of impact energy that is applied to the steering wheel 1 during a secondary collision with the stroke through which the steering wheel 1 displaces in the forward direction become uselessly large.

In the example in the figures, the metal wire of the energy absorbing member 22f is not pressed, however, it is possible to also employ construction as in the first example of an embodiment of the present invention, in which the height with respect to the stroking surface gradually increases in at least the portions further toward the tip end side than the bent back curved section 29f, 29g. Moreover, in this example, alternatively or additionally, by pressing in the radial direction only the portions of the bent back curved sections 29f, 29g provided in the middle sections of the impact absorbing sections 28f, 28g of the energy absorbing member 22f, it is possible to employ construction in which it becomes easy for these bent back curved sections 29f, 29g to plastically deform. On the other hand, the portions on the tip end side of the impact absorbing sections 28f, 28g are kept as are with a circular cross section, and thus it is possible to maintain the total amount of impact energy that can be absorbed by the energy absorbing member 22f so that the load required for causing the portions on the tip end sides of the impact absorbing sections 28f, 28g to plastically deform does not become too low.

Fifth Example

Figure 14:
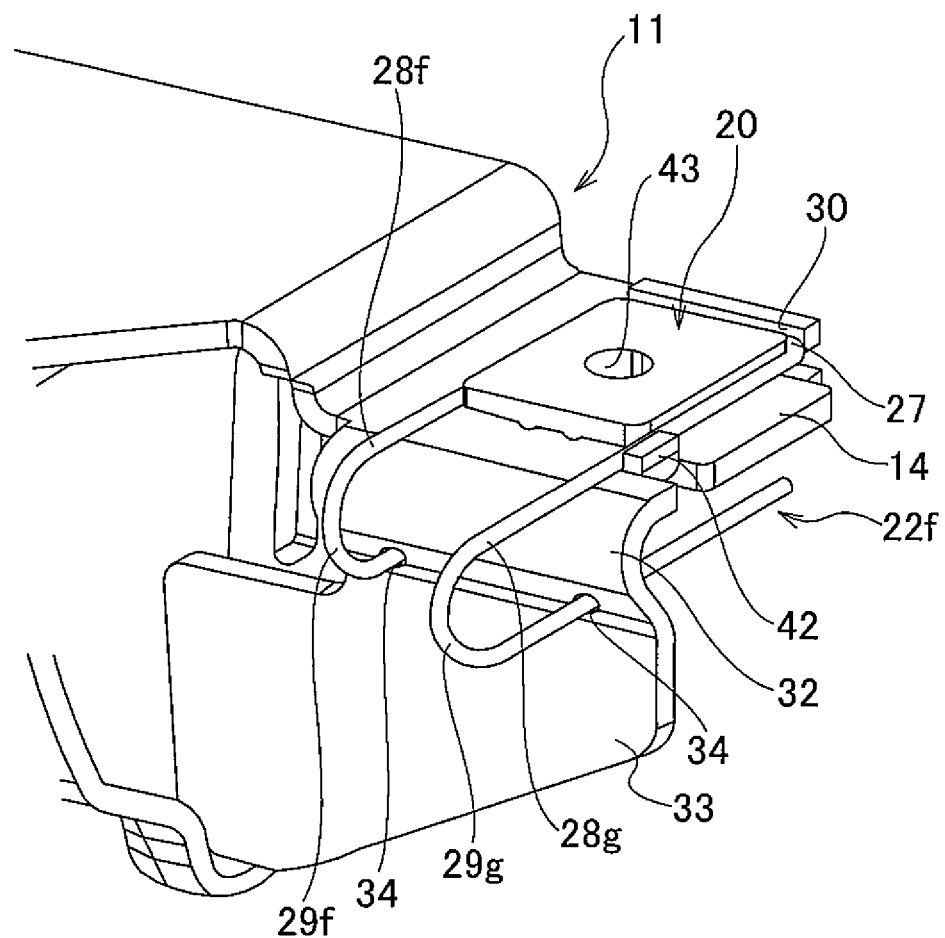
FIG. 14 is a drawing similar to FIG. 9 illustrates part of the steering apparatus of a fifth example of an embodiment of the present invention.
Figure 15:
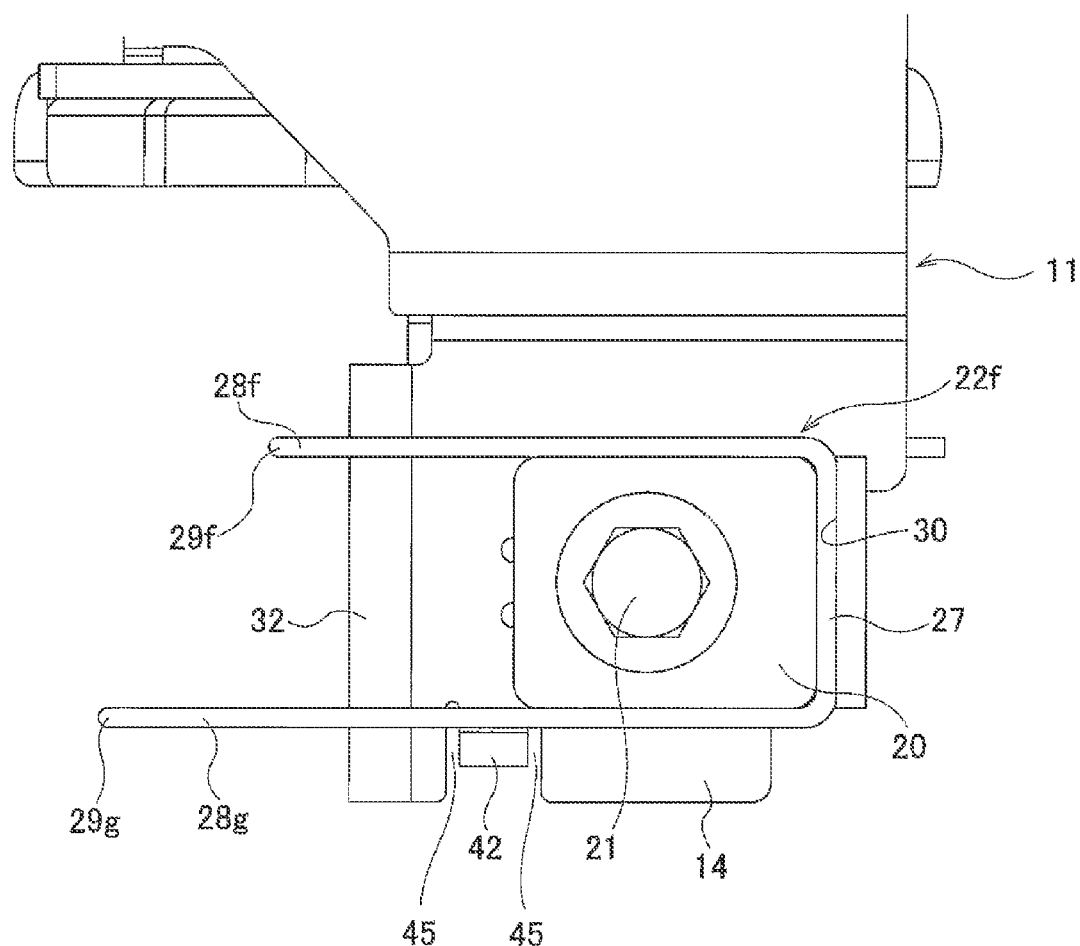
FIG. 15 is a top view of the portion illustrated in FIG. 14.
Figure 16:
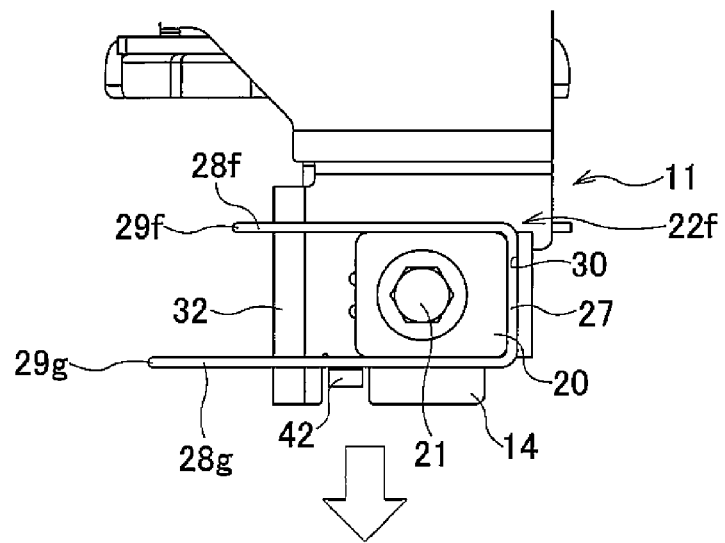
FIGS. 16A to 16C are top views of the portion illustrated in FIG. 14, and illustrate changes in the condition of the steering apparatus as a secondary collision advances.
Figure 16:
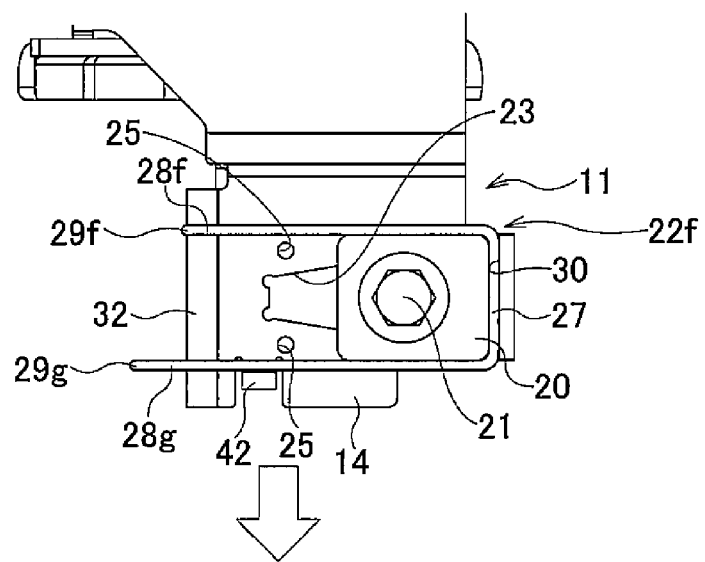
Figure 16:
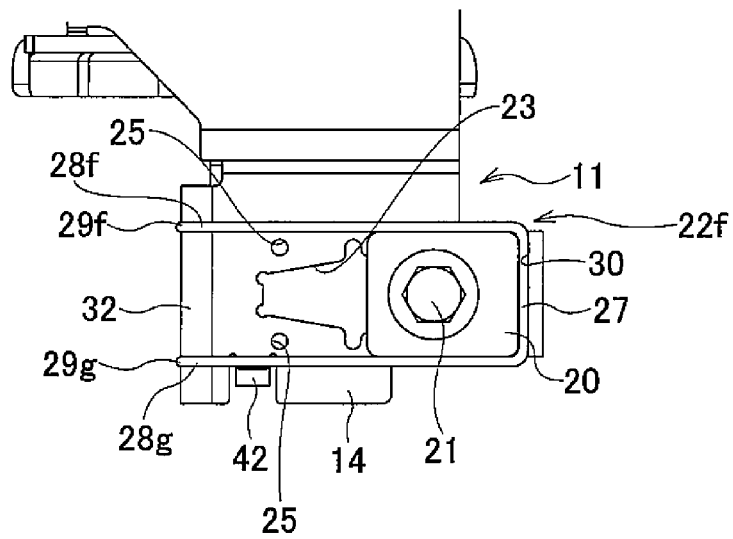

FIG. 14 to FIG. 16 illustrate a fifth example of an embodiment of the present invention. In this example, on the top surface of part of the installation plate section 14 of the column-side bracket 11, a bent up piece 42, which is a locking section, is provided in the portion adjacent to the impact absorbing section 28g that is located on the outside in the width direction of the steering column 6 (see FIG. 19). In other words, in this example, of the energy absorbing members 22f, the first impact absorbing sections 28f are located on the center sides in the width direction (center axis sides of the steering column 6) of the column-side bracket 11 of the installation plate sections 14, and the second impact absorbing sections 28g are located on both end sides in the width direction (outside separated from the steering column 6) of the column-side bracket 11 of the installation plate sections 14, and are mounted between the locking capsule 20 and the installation plate section 14. Moreover, bent up pieces 42 are formed on both end sections (outside edges) in the width direction of the column-side bracket 11 of the installation plate sections 14 by bending upward the portions between each pair of gaps 45 that are formed separated in the forward-backward direction. The bent up piece 42 comes in contact with or closely faces the outside edge in the width direction of the impact absorbing section 28g.

With the construction of this example in which a bent up piece 42 is provided as described above, after the impact absorbing section 28f begins to plastically deform, and until the impact absorbing section 28g begins to plastically deform, it is possible to prevent the energy absorbing member 22f from rotating. In other words, the positional relationship between the energy absorbing member 22f and the installation plate section 14 as a secondary collision advances changes in the order illustrated in FIGS. 16A to 16C. In other words, from the normal state illustrated in FIG. 16A, in the initial stage of a secondary collision, only the impact absorbing section 28f is engaged with the stroking section 32 on the front end edge of the installation plate section 14 as illustrated in FIG. 16B, and as the secondary collision further advances, the impact absorbing sections 28f, 28g engage with the stroking section 32 on the front end edge of the installation plate section 14 as illustrated in FIG. 16C.

In the process illustrated in FIG. 16B to FIG. 16C, an impact load is applied to the energy absorbing member 22f in a state that is not uniform on the right and left. More specifically, as a result of only the impact absorbing section 28f being strongly pulled, a force is applied to the energy absorbing member 22f that tries to rotates the energy absorbing member 22f in the counterclockwise direction. When the energy absorbing member 22f rotates due to this force, there is a possibility that stability of the impact energy absorption will be lost. However, in the case of the construction of this example, the bent up piece 42 and the impact absorbing section 28g engage, which prevents the energy absorbing member 22f from rotating in the counterclockwise direction in FIG. 16. As a result, the change illustrated in FIGS. 16A to 16C is performed smoothly, so it is possible for the energy absorbing member 22f to plastically deform as desired, and thus it is possible for energy absorption to be performed smoothly. The construction and functions of the other parts are the same as in the fourth example.

Sixth Example

Figure 17:
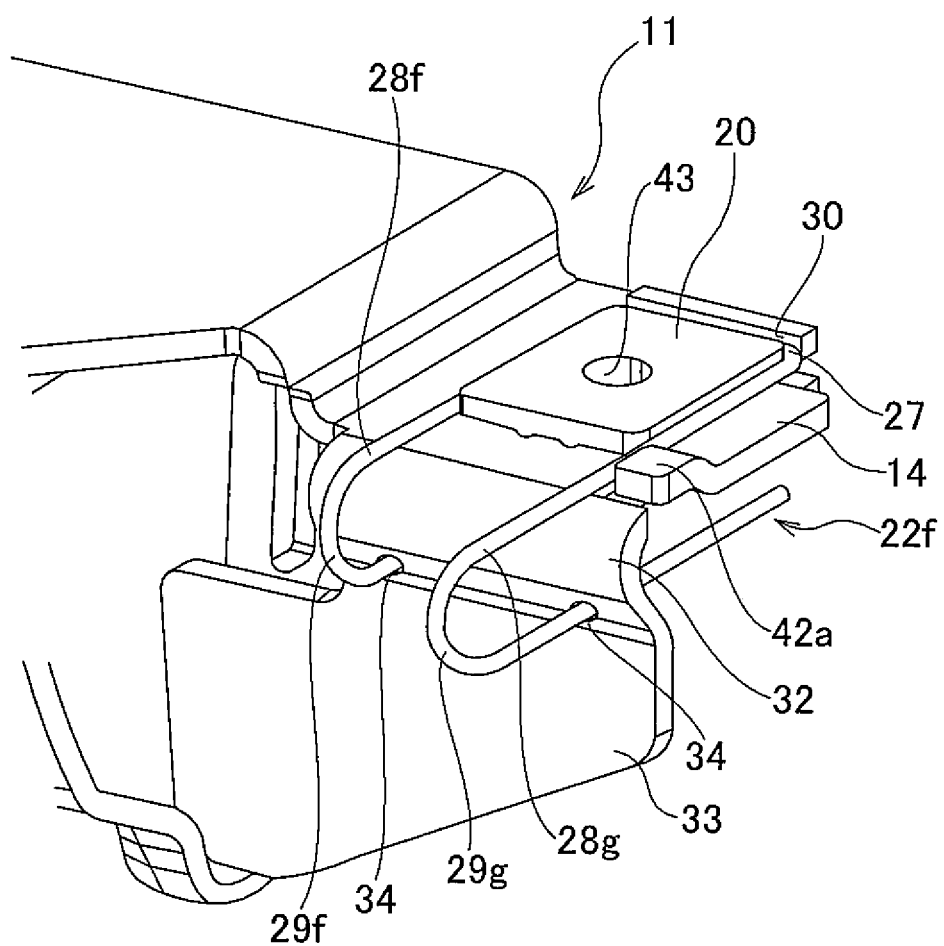
FIG. 17 is a drawing similar to FIG. 9, and illustrates part of a steering apparatus of a sixth example of an embodiment of the present invention.
Figure 18:
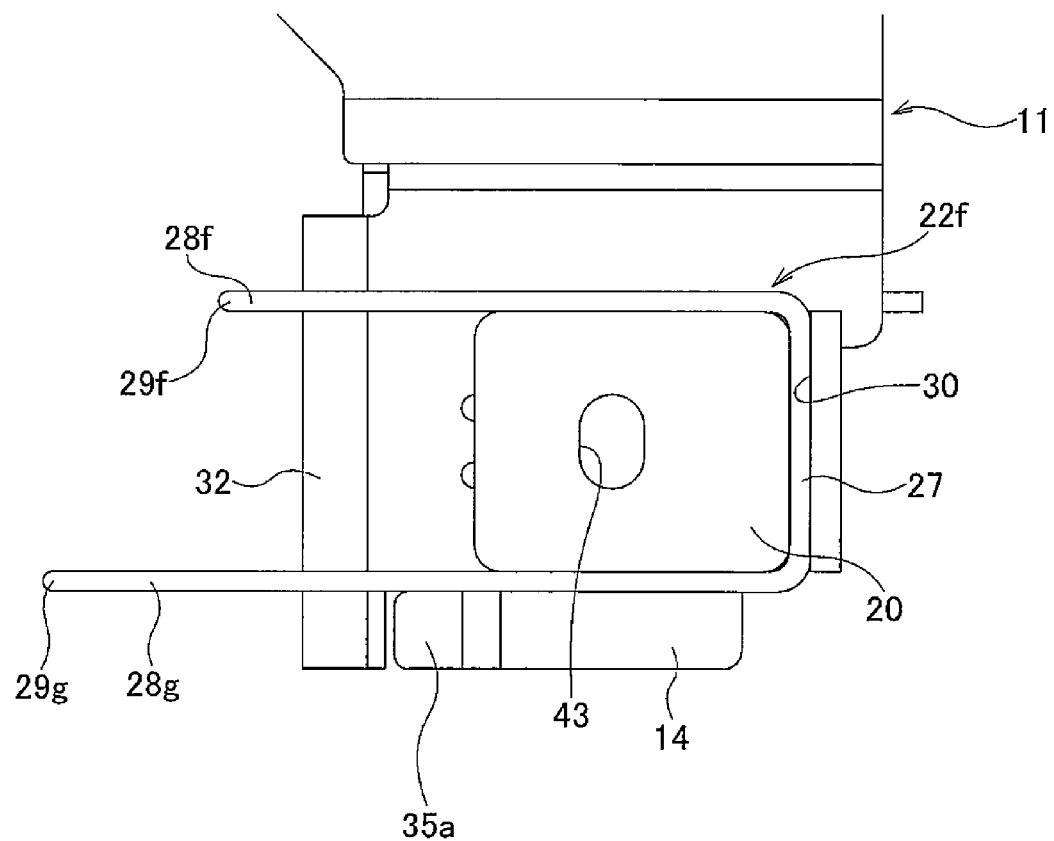
FIG. 18 is a top view of the portion illustrated in FIG. 17.

FIG. 17 to FIG. 18 illustrate a sixth example of an embodiment of the present invention. In this example, the shape of the bent up piece 42a, which is a locking member for preventing rotation of the energy absorbing member 22f during a secondary collision is different than that in the fifth example. That is, in this example, the bent up pieces 42 are formed by bending the inside portions of L-shaped gaps that are formed on both end sections in the width direction of the column-side bracket 11 of the right and left installation plate sections 14. In the example in the figures, the bent up piece 42a is bent up in a crank shape, however, it is also possible for the bent up piece to be bent upward at simply a right angle. Moreover, the direction of the L-shaped gap can be reversed in the forward-backward direction from that of the example in the figure, and the direction of bending the bent up piece can also be reversed in the forward-backward direction. The construction and functions of the other parts are the same as in the fifth example.

In any of the examples of an embodiment of the present invention, the steering column is supported by the vehicle by locking notches that are provided in right and left installation plate sections of a column-side bracket (rear-side support bracket) that is fastened to the middle section of the steering column engaging with locking members (locking capsules) that are fastened to the vehicle. However, of the examples of an embodiment of the present invention, particularly in the case of the first example through third example, construction is not limited to this kind of construction, and construction is also possible in which the steering column is supported by the vehicle by a locking notch that is provided in one location in the center section in the width direction of the rear-side support bracket engaging with a locking member that is fastened to the vehicle. Furthermore, it is also possible to additionally further change the energy absorption characteristics of the energy absorbing member for absorbing an impact load by performing the heat treatment as disclosed in JP 2001-114113 (A) on the energy absorbing members of the examples of an embodiment of the present invention.

EXPLANATION OF REFERENCE NUMBERS

1 Steering wheel
2 Steering unit
3 Input shaft
4 Tie rod
5 Steering shaft
6 Steering column
7 Universal joint
8 Intermediate shaft
9 Universal joint
10 Electric motor
11 Column-side bracket
12 Tilt bolt
13 Support plate section
14, 14a Installation plate section
15 Vehicle-side bracket
16 Outer column
17 Inner column
18 Outer shaft
19 Inner shaft
20, 20a Locking capsule
21 Bolt
22, 22a to 22g Energy absorbing member
23 Locking notch
24 Locking groove
25 Small through hole
26 Small through hole
27, 27a Base section
28, 28a to 28g Impact absorbing section
29, 29a to 29g Bent back curved section
30 Support groove
31 Hanger bracket
32, 32a Stroking section
33, 33a Downward hanging plate section
34, 34a Small through hole
35 Rear-side support bracket
36 Front-side downward hanging plate section
37 Rear-side downward hanging plate section
38 Circular hole
39 Notch
40 Front-side support bracket
41 Space 42, 42a Bent up piece
43 Through hole
44 Small notch
45 Gap

What is claimed is:

1. An energy absorbing member made using a metal material that is plastically deformable and comprising:
   a base section that is supported by one of portions that are supported by either of a steering column or a vehicle; and
   an impact absorbing section that continues from the base section and extends in one direction in a forward-backward direction, and having a bent back curved section in a middle section that is bent in a U shape, with a tip end facing an opposite direction relative to the forward-backward direction;
   the energy absorbing member capable of absorbing an impact load that is applied during a secondary collision when the steering column displaces in a forward direction due to the impact load by allowing the bent back curved section to move toward a tip end side while a stroking section, which is provided on the other of the portions that are supported by either the steering column or vehicle, strokes the bent back curved section; and
   the impact absorbing section having the same cross-sectional area along the entire length, and the section modulus with respect to an axis in a width direction of a stroking surface of the stroking section gradually increasing going toward the tip end side in at least a portion thereof nearer the tip end side than the bent back curved section.

2. The energy absorbing member according to claim 1, wherein a height of the impact absorbing section with respect to the stroking surface of the stroking section gradually increases going toward the tip end side in at least the portion nearer the tip end side than the bent back curved section.

3. The energy absorbing member according to claim 2, wherein
   the energy absorbing member is formed by bending a wire material;
   the base section is provided in a center section of the wire material, and extends in the width direction;
   a pair of right and left impact absorbing sections are provided as the impact absorbing section so as to continue and extend from both ends of the base section, with the tip ends of the impact absorbing sections being free ends; and
   in at least a portion of each of the impact absorbing sections nearer the tip end side than the bent back curved section, the height with respect to the stroking surface of the stroking section gradually increases going toward the tip end side.

4. The energy absorbing member according to claim 3, wherein the cross-sectional shape of the wire material is a circular shape.

5. The energy absorbing member according to claim 3, wherein the cross-sectional shape of the wire material is a rectangular shape.

6. The energy absorbing member according to claim 3, wherein
   the pair of right and left impact absorbing sections are constructed with:
   a first impact absorbing section that has a first bent back curved section; and
   a second impact absorbing section that has a second bent back curved section, the second bent back curved section is separated from the base section more than the first bent back curved section is separated from the base section.

7. An impact absorbing steering apparatus, comprising:
   a steering column;
   a column-side bracket that is supported by the steering column, and supports a middle section of the steering column;
   a vehicle-side bracket that is supported by a vehicle, and is fastened to the vehicle;
   a locking member that is supported by the vehicle, and together with being fastened to the vehicle-side bracket, locks the column-side bracket so that when an impact load is applied in a forward direction to the steering column, the steering column and the column-side bracket are able to break away in the forward direction and
   an energy absorbing member is provided between the steering column or column-side bracket and the vehicle-side bracket or the locking member;
   wherein the energy absorbing member is made using a metal material that is plastically deformable and comprises
   a base section that is supported by one of portions that are supported by either of the steering column or the vehicle; and
   an impact absorbing section that continues from the base section and extends in one direction in a forward-backward direction, and having a bent back curved section in a middle section that is bent in a U shape with a tip end facing an opposite direction relative to the one direction of the forward-backward direction;
   the energy absorbing member capable of absorbing the impact load that is applied during a secondary collision when the steering column displaces in the forward direction due to the impact load by allowing the bent back curved section to move toward a tip end side while a stroking section, which is provided on another of the portions that are supported by either the steering column or vehicle, strokes the bent back curved section: and
   the impact absorbing section having a cross-sectional area which is along an entire length of the impact absorbing section, and the section modulus with respect to an axis extending in a width direction of a stroking surface of the stroking section gradually increasing going toward the tip end side in at least a portion of the impact absorbing section nearer the tip end side than the bent back curved section.

8. The impact absorbing steering apparatus according to claim 7, wherein
   the column-side bracket has a pair of installation plate sections that are provided so as to project on right and left sides of the steering column; and
   each installation plate section comprises a locking notch that is open on an edge of a rear end, and a convex curved surface that constitutes the stroking surface of the stroking section;
   a pair of locking members are provided on the right and left sides of the steering column as the locking member, the locking members being composed of a pair of locking capsules, and each of the locking capsules that comprises: locking grooves that are provided on right and left side surfaces of the locking capsule that engage with portions on both sides of the locking notch in part of each of the installation plate sections, and a through hole that is provided in a portion of the locking capsule which is located between the locking grooves;

the column-side bracket is supported by and fastened to the vehicle side bracket by the locking capsules locking with the installation plate sections; and a pair of energy absorbing members are provided on the right and left sides of the steering column as the energy absorbing member, and the base section of each of the energy absorbing members is locked to a rear section of each of the locking capsules so as to be prevented from displacing in the forward direction, and inner edges of the bent back curved section of the impact absorbing section face the convex curved surface.

9. The impact absorbing steering apparatus according to claim 8, wherein the pair of right and left impact absorbing sections are constructed with:

a first impact absorbing section that has a first bent back curved section; and a second impact absorbing section that has a second bent back curved section, the second bent back curved section is separated from the base section more than the first bent back curved section is separated from the base section, and a locking section is provided in a portion of the top surface of the installation plate section that is adjacent to the second impact absorbing section in order to prevent the energy absorbing member from rotating due to an impact load that is applied to the first bent back curved section after the first bent back curved section has begun to be stroked by the convex curved surface due to a secondary collision.

10. The impact absorbing steering apparatus according to claim 9 wherein the energy absorbing members are provided between the pair of installation plate sections and the locking capsules that are locked to the installation plate sections, and the first impact absorbing sections of the energy absorbing members are located on center sides in the width direction of the column-side bracket of the installation plate sections, and the second impact absorbing sections of the energy absorbing members are located on both end sides in the width direction of the column-side bracket of the installation plate sections, and locking sections are formed by bending upward part of both end sections in the width direction of the column-side bracket of the installation plate sections.

11. The impact absorbing steering apparatus according to claim 10, wherein the locking sections are bent up pieces that are formed by bending upward portions between a pair of gaps that are formed being separated in the forward-backward direction in both end sections in the width direction of the column-side bracket of the installation plate sections.

12. An energy absorbing member made using a metal material that is plastically deformable and comprising:

a base section that is supported by one of portions that are supported by either of a steering column or a vehicle; and an impact absorbing section that continues from the base section and extends in one direction in a forward-backward direction, and having a bent back curved section in a middle section that is bent in a U shape with a tip end facing an opposite direction relative to the one direction of the forward-backward direction;

the energy absorbing member capable of absorbing an impact load that is applied during a secondary collision when the steering column displaces in a forward direction due to the impact load by allowing the bent back curved section to move toward a tip end side while a stroking section, which is provided on another of the portions that are supported by either the steering column or vehicle, strokes the bent back curved section; and the impact absorbing section having a cross-sectional area which is uniform along an entire length of the impact absorbing section, and the section modulus with respect to an axis extending in a width direction of a stroking surface of the stroking section gradually increasing going toward the tip end side in at least a portion of the impact absorbing section nearer the tip end side than the bent back curved section.

13. The energy absorbing member according to claim 12, wherein a height of the impact absorbing section with respect to the stroking surface of the stroking section gradually increases going toward the tip end side in at least the portion nearer the tip end side than the bent back curved section.

14. The energy absorbing member according to claim 13, wherein the energy absorbing member is formed by bending a wire material;

the base section is provided in a center section of the wire material, and extends in the width direction;

a pair of right and left impact absorbing sections are provided as the impact absorbing section so as to continue and extend from both ends of the base section, with tip ends of the impact absorbing sections being free ends; and in at least a portion of each of the impact absorbing sections which correspond to the portion nearer the tip end side than the bent back curved section, the height with respect to the stroking surface of the stroking section gradually increases going toward the tip end side.

15. The energy absorbing member according to claim 14, wherein the cross-sectional shape of the wire material is a circular shape.

16. The energy absorbing member according to claim 14, wherein the cross-sectional shape of the wire material is a rectangular shape.

17. The energy absorbing member according to claim 14, wherein the pair of right and left impact absorbing sections are constructed with:

a first impact absorbing section that has a first bent back curved section; and a second impact absorbing section that has a second bent back curved section, the second bent back curved section is separated from the base section more than the first bent back curved section is separated from the base section.

* * * * *